United States Patent
Dallal et al.

(10) Patent No.: US 11,973,709 B2
(45) Date of Patent: Apr. 30, 2024

(54) SIGNALING FOR A DYNAMIC DEMODULATION REFERENCE SIGNAL MODE

(71) Applicant: QUALCOMM Incorporated, San Diego, CA (US)

(72) Inventors: Yehonatan Dallal, Kfar Saba (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/332,332

(22) Filed: May 27, 2021

(65) Prior Publication Data

US 2022/0385420 A1    Dec. 1, 2022

(51) Int. Cl.
*H04L 5/00* (2006.01)
*H04W 72/51* (2023.01)

(52) U.S. Cl.
CPC .......... *H04L 5/0048* (2013.01); *H04W 72/51* (2023.01)

(58) Field of Classification Search
CPC ..... H04L 5/0048; H04L 5/0051; H04W 72/51
See application file for complete search history.

(56) References Cited

U.S. PATENT DOCUMENTS

| 2016/0227559 | A1* | 8/2016 | Schober | H04W 72/542 |
| 2020/0067676 | A1* | 2/2020 | Yi | H04W 72/0446 |
| 2020/0351682 | A1* | 11/2020 | Cirik | H04L 5/0091 |
| 2021/0105121 | A1* | 4/2021 | Chae | H04L 5/0048 |

\* cited by examiner

*Primary Examiner* — Justin T Van Roie
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, an indication to operate in a dynamic demodulation reference signal (DMRS) mode, wherein the dynamic DMRS mode includes a use of dynamic DMRS configurations without an explicit indication of DMRS resource locations for the dynamic DMRS configurations. The UE may receive, from the base station based at least in part on receiving the indication to operate in the dynamic DMRS mode, a DMRS using a first dynamic DMRS configuration. Numerous other aspects are described.

30 Claims, 11 Drawing Sheets

SIGNALING FOR A DYNAMIC DEMODULATION REFERENCE SIGNAL MODE

FIELD OF THE DISCLOSURE

Aspects of the present disclosure generally relate to wireless communication and to techniques and apparatuses for signaling for a dynamic demodulation reference signal (DMRS) mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
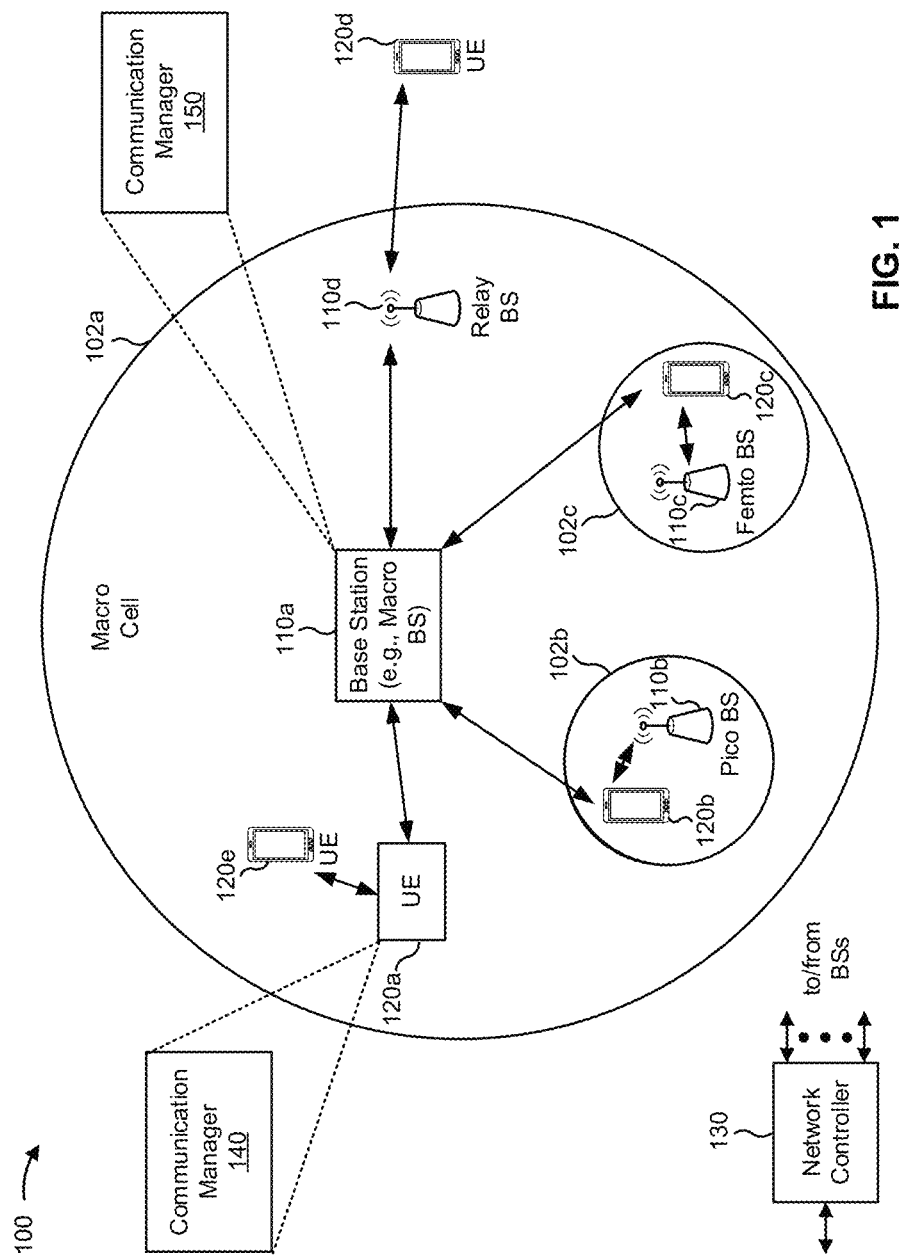
FIG. 1 is a diagram illustrating an example of a wireless network, in accordance with the present disclosure.

In some aspects, a user equipment (UE) for wireless communication includes a memory and one or more processors, coupled to the memory, configured to: receive, from a base station, an indication to operate in a dynamic demodulation reference signal (DMRS) mode, where the dynamic DMRS mode includes a use of dynamic DMRS configurations without an explicit indication of DMRS resource locations for the dynamic DMRS configurations; and receive, from the base station based at least in part on receiving the indication to operate in the dynamic DMRS mode, a DMRS using a first dynamic DMRS configuration.

In some aspects, a base station for wireless communication includes a memory and one or more processors, coupled to the memory, configured to: transmit, to a UE, an indication to operate in a dynamic DMRS mode, where the dynamic DMRS mode includes the base station using dynamic DMRS configurations without an explicit indication of DMRS resource locations for the dynamic DMRS configurations; and transmit, to the UE based at least in part on transmitting the indication to operate in the dynamic DMRS mode, a DMRS using a first dynamic DMRS configuration.

In some aspects, a method of wireless communication performed by a UE includes receiving, from a base station, an indication to operate in a dynamic DMRS mode, where the dynamic DMRS mode includes a use of dynamic DMRS configurations without an explicit indication of DMRS resource locations for the dynamic DMRS configurations; and receiving, from the base station based at least in part on receiving the indication to operate in the dynamic DMRS mode, a DMRS using a first dynamic DMRS configuration.

In some aspects, a method of wireless communication performed by a base station includes transmitting, to a UE, an indication to operate in a dynamic DMRS mode, where the dynamic DMRS mode includes the base station using dynamic DMRS configurations without an explicit indication of DMRS resource locations for the dynamic DMRS configurations; and transmitting, to the UE based at least in part on transmitting the indication to operate in the dynamic DMRS mode, a DMRS using a first dynamic DMRS configuration.

In some aspects, a non-transitory computer-readable medium storing a set of instructions for wireless communication includes one or more instructions that, when executed by one or more processors of a UE, cause the UE to: receive, from a base station, an indication to operate in a dynamic DMRS mode, where the dynamic DMRS mode includes a use of dynamic DMRS configurations without an explicit indication of DMRS resource locations for the dynamic DMRS configurations; and receive, from the base station based at least in part on receiving the indication to operate in the dynamic DMRS mode, a DMRS using a first dynamic DMRS configuration.

In some aspects, a non-transitory computer-readable medium storing a set of instructions for wireless communication includes one or more instructions that, when executed by one or more processors of a base station, cause the base station to: transmit, to a UE, an indication to operate in a dynamic DMRS mode, where the dynamic DMRS mode includes the base station using dynamic DMRS configurations without an explicit indication of DMRS resource locations for the dynamic DMRS configurations; and transmit, to the UE based at least in part on transmitting the indication to operate in the dynamic DMRS mode, a DMRS using a first dynamic DMRS configuration.

In some aspects, an apparatus for wireless communication includes means for receiving, from a base station, an indication to operate in a dynamic DMRS) mode, where the dynamic DMRS mode includes a use of dynamic DMRS configurations without an explicit indication of DMRS resource locations for the dynamic DMRS configurations; and means for receiving, from the base station based at least in part on receiving the indication to operate in the dynamic DMRS mode, a DMRS using a first dynamic DMRS configuration.

In some aspects, an apparatus for wireless communication includes means for transmitting, to a UE, an indication to operate in a dynamic DMRS mode, where the dynamic DMRS mode includes the base station using dynamic DMRS configurations without an explicit indication of DMRS resource locations for the dynamic DMRS configurations; and means for transmitting, to the UE based at least in part on transmitting the indication to operate in the dynamic DMRS mode, a DMRS using a first dynamic DMRS configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a base station 110, an indication to operate in a dynamic demodulation reference signal (DMRS) mode, where the dynamic DMRS mode includes a use of dynamic DMRS configurations without an explicit indication of DMRS resource locations for the dynamic DMRS configurations; and receive, from the base station 110 based at least in part on receiving the indication to operate in the dynamic DMRS mode, a DMRS using a first dynamic DMRS configuration. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, an indication to operate in a dynamic DMRS mode, where the dynamic DMRS mode includes the base station 110 using dynamic DMRS configurations without an explicit indication of DMRS resource locations for the dynamic DMRS configurations; and transmit, to the UE 120 based at least in part on transmitting the indication to operate in the dynamic DMRS mode, a DMRS using a first dynamic DMRS configuration. Additionally, or alternatively, the communication manager 150 may perform one or more other operations described herein.

As indicated above, FIG. 1 is provided as an example. Other examples may differ from what is described with regard to FIG. 1.

Figure 2:
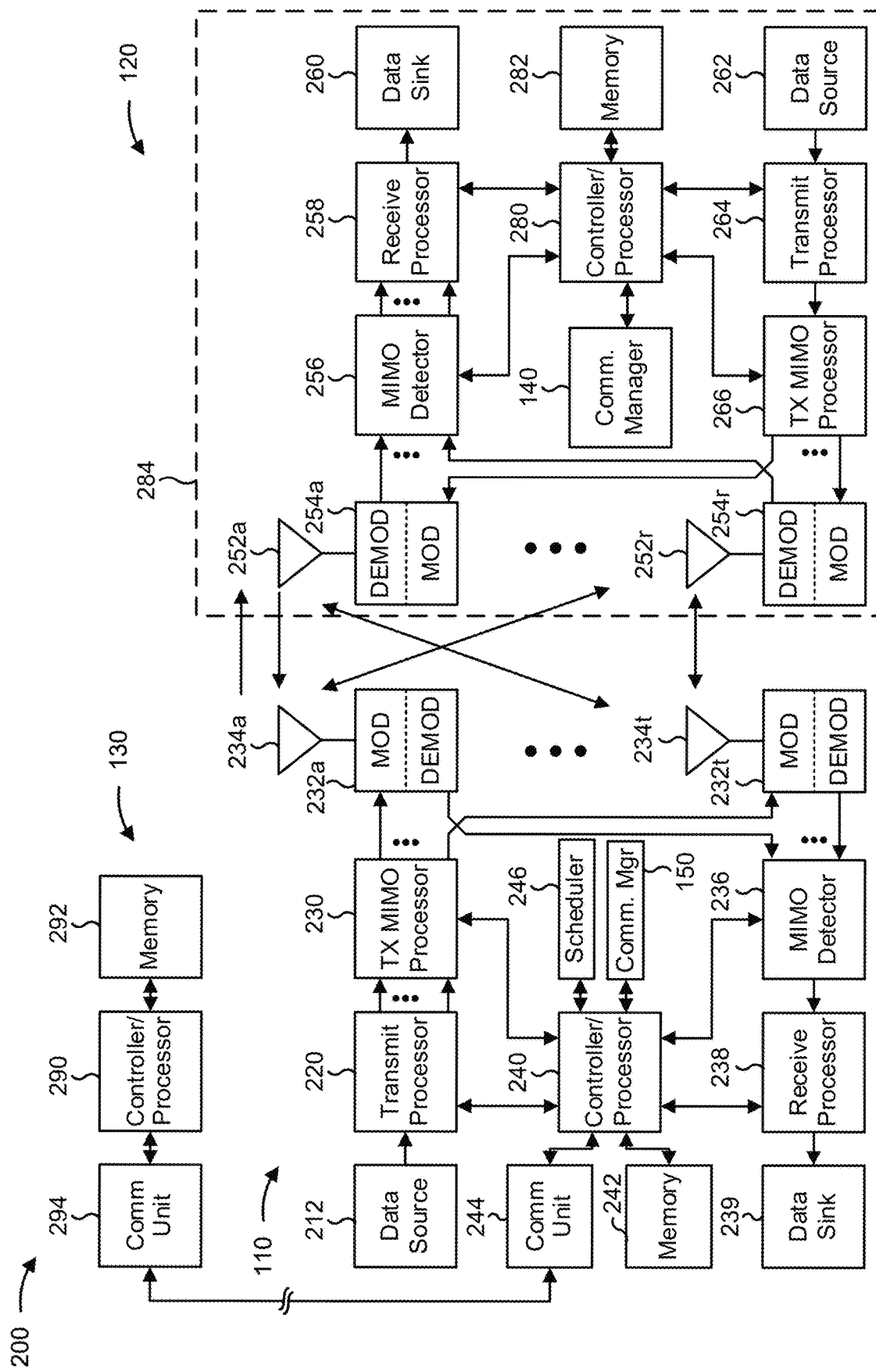
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-9).

Controller/processor 240 of base station 110, controller/processor 280 of UE 120, and/or any other component(s) of FIG. 2 may perform one or more techniques associated with signaling for a dynamic DMRS mode, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for receiving, from a base station, an indication to operate in a dynamic DMRS mode, where the dynamic DMRS mode includes a use of dynamic DMRS configurations without an explicit indication of DMRS resource locations for the dynamic DMRS configurations; and/or means for receiving, from the base station based at least in part on receiving the indication to operate in the dynamic DMRS mode, a DMRS using a first dynamic DMRS configuration, among other examples as described herein. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE, an indication to operate in a dynamic DMRS mode, where the dynamic DMRS mode includes the base station using dynamic DMRS configurations without an explicit indication of DMRS resource locations for the dynamic DMRS configurations; and/or means for transmitting, to the UE based at least in part on transmitting the indication to operate in the dynamic DMRS mode, a DMRS using a first dynamic DMRS configuration, among other examples as described herein. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
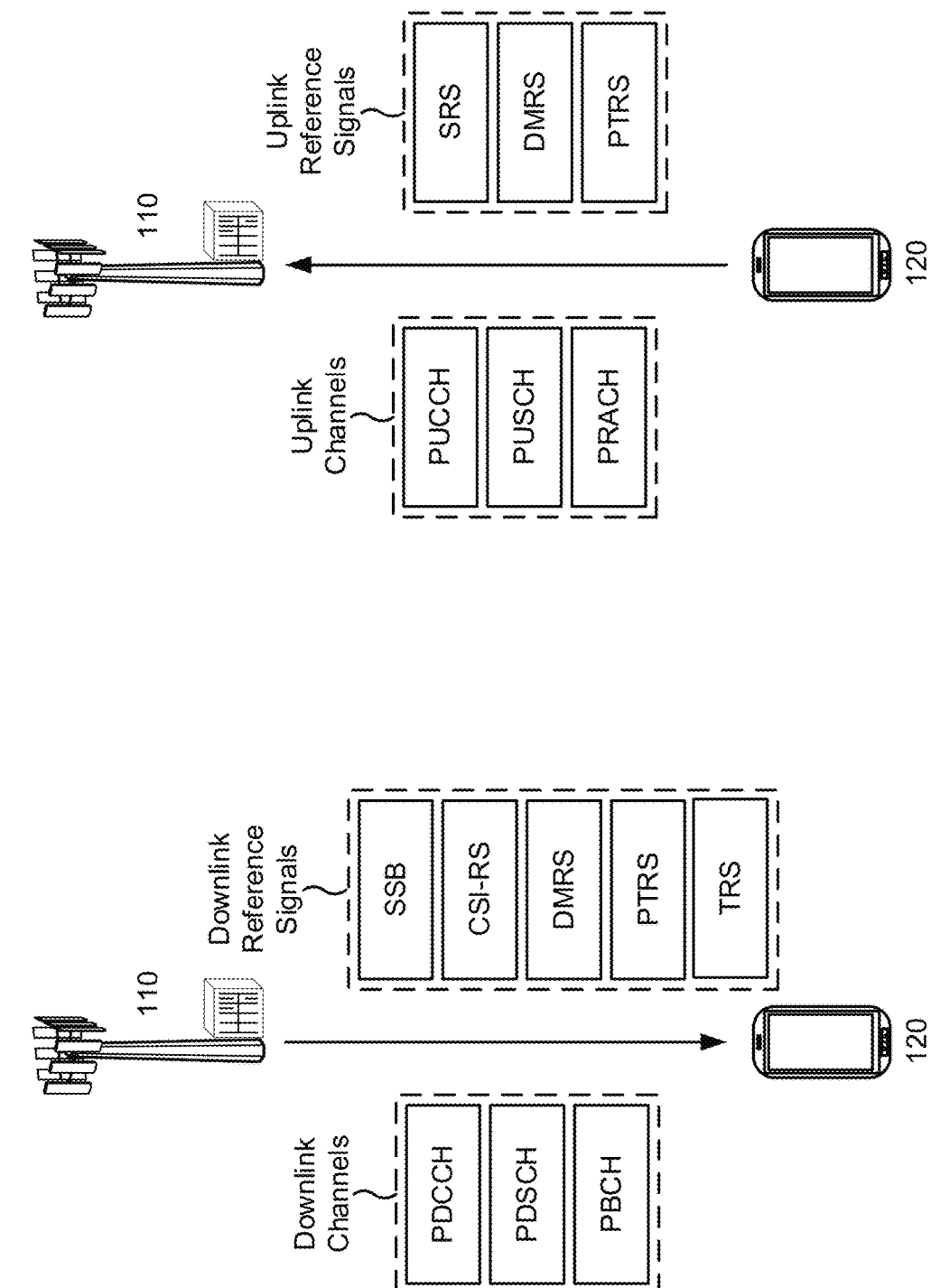
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), a phase tracking reference signal (PTRS), and/or a tracking reference signal (TRS), among other examples. As also shown, an uplink reference signal may include a sounding reference signal (SRS), a DMRS, or a PTRS, among other examples.

An SSB may carry information used for initial network acquisition and synchronization, such as a PSS, a SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A TRS may be a downlink reference signal (not shown in FIG. 3) and may carry information used to assist in time domain and frequency domain tracking. The TRS may be used to track transmission path delay spread and/or Doppler spread, among other examples. A TRS may be UE-specific. In some examples, a TRS may be transmitted in a TRS burst. A TRS burst may consist of four OFDM symbols in two consecutive slots. In some examples, a TRS may be associated with one or more CSI-RS configurations. For example, a TRS burst may use one or more CSI-RS resources.

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
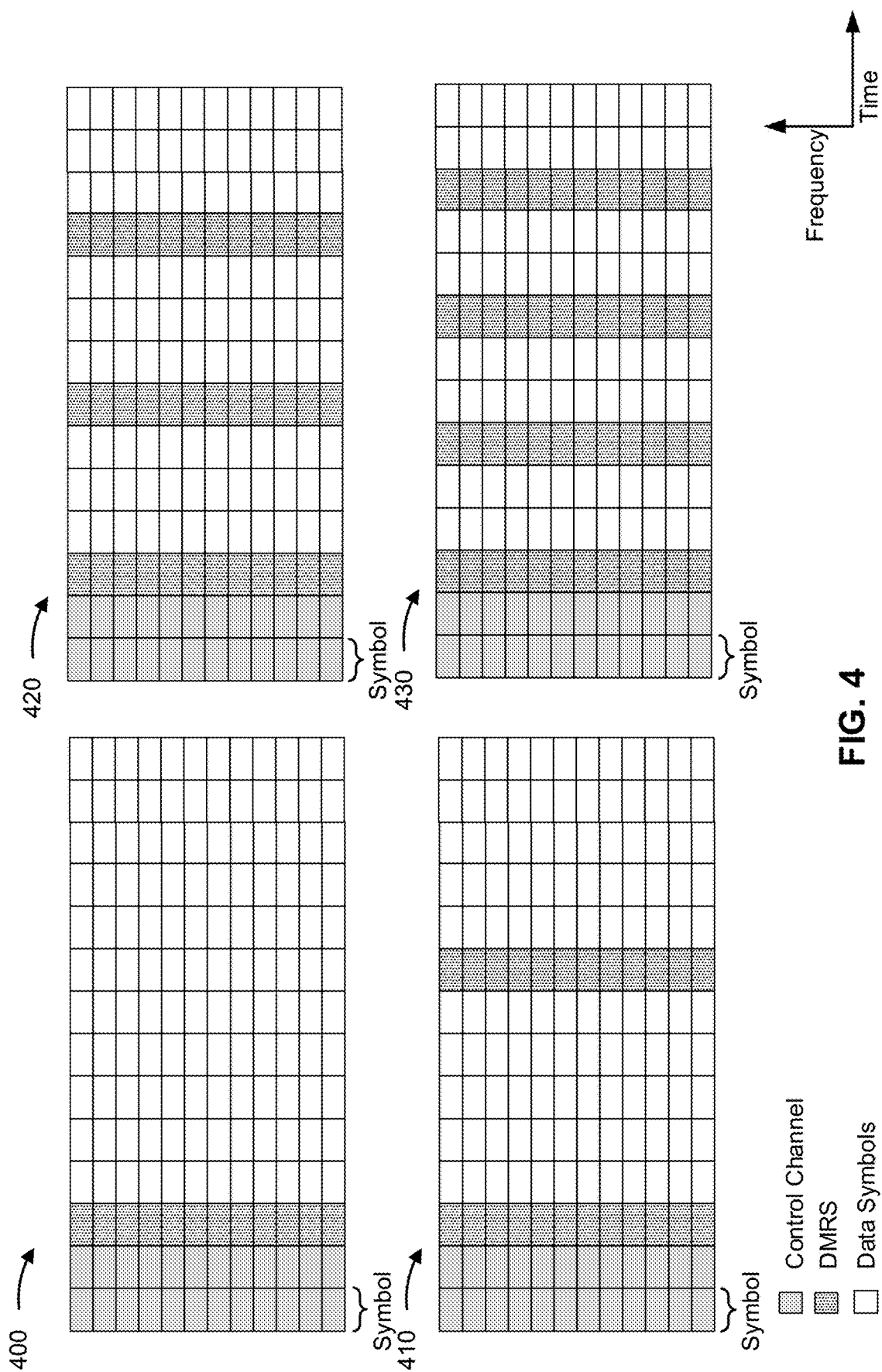
FIGS. 4 and 5 are diagrams illustrating examples of demodulation reference signal (DMRS) patterns, in accordance with the present disclosure.

FIG. 4 is a diagram illustrating examples 400, 410, 420, and 430 of DMRS patterns, in accordance with the present disclosure. The DMRS patterns may be used in a data transmission to facilitate channel equalization, demodulation, and/or decoding, among other examples, by a receiving device. For example, a UE may receive a downlink communication having a control channel (e.g., a PDCCH), data symbols of a data channel (e.g., a PDSCH), and one or more occasions of DMRSs (e.g., occupying one or more symbols of the data channel). In other examples, a base station may receive an uplink communication having a control channel (e.g., a PUCCH), a data channel (e.g., a PUSCH), and one or more occasions of DMRSs (e.g., occupying one or more symbols of the PUSCH). In other examples, a base station may receive a sidelink communication having a control channel (e.g., a physical sidelink control channel (PSCCH)), a data channel (e.g., a physical sidelink shared channel (PSSCH)), and one or more occasions of DMRSs (e.g., occupying one or more symbols of the PSSCH).

As shown by reference number 400, a communication (e.g., an uplink communication, a downlink communication, and/or a sidelink communication) may include one DMRS occasion. As shown, the one DMRS occasion may occupy a first symbol of a data channel (e.g., before a first data symbol of the data channel).

As shown by reference number 410, a communication (e.g., an uplink communication, a downlink communication, and/or a sidelink communication) may include two DMRS occasions. As shown, a first of the two DMRS occasions may occupy a first symbol of a data channel (e.g., before a first data symbol of the data channel) and a second of the two DMRS occasions may occupy a subsequent symbol.

As shown by reference number 420, a communication (e.g., an uplink communication, a downlink communication, and/or a sidelink communication) may include three DMRS occasions. As shown, a first of the three DMRS occasions may occupy a first symbol of a data channel (e.g., before a first data symbol of the data channel) and a second and a third of the three DMRS occasions may occupy subsequent symbols.

As shown by reference number 430, a communication (e.g., an uplink communication, a downlink communication, and/or a sidelink communication) may include four DMRS occasions. As shown, a first of the four DMRS occasions may occupy a first symbol of a data channel (e.g., before a first data symbol of the data channel) and a second, a third, and a fourth of the four DMRS occasions may occupy subsequent symbols.

As indicated above, FIG. 4 is provided as an example. Other examples may differ from what is described with regard to FIG. 4.

Figure 5:
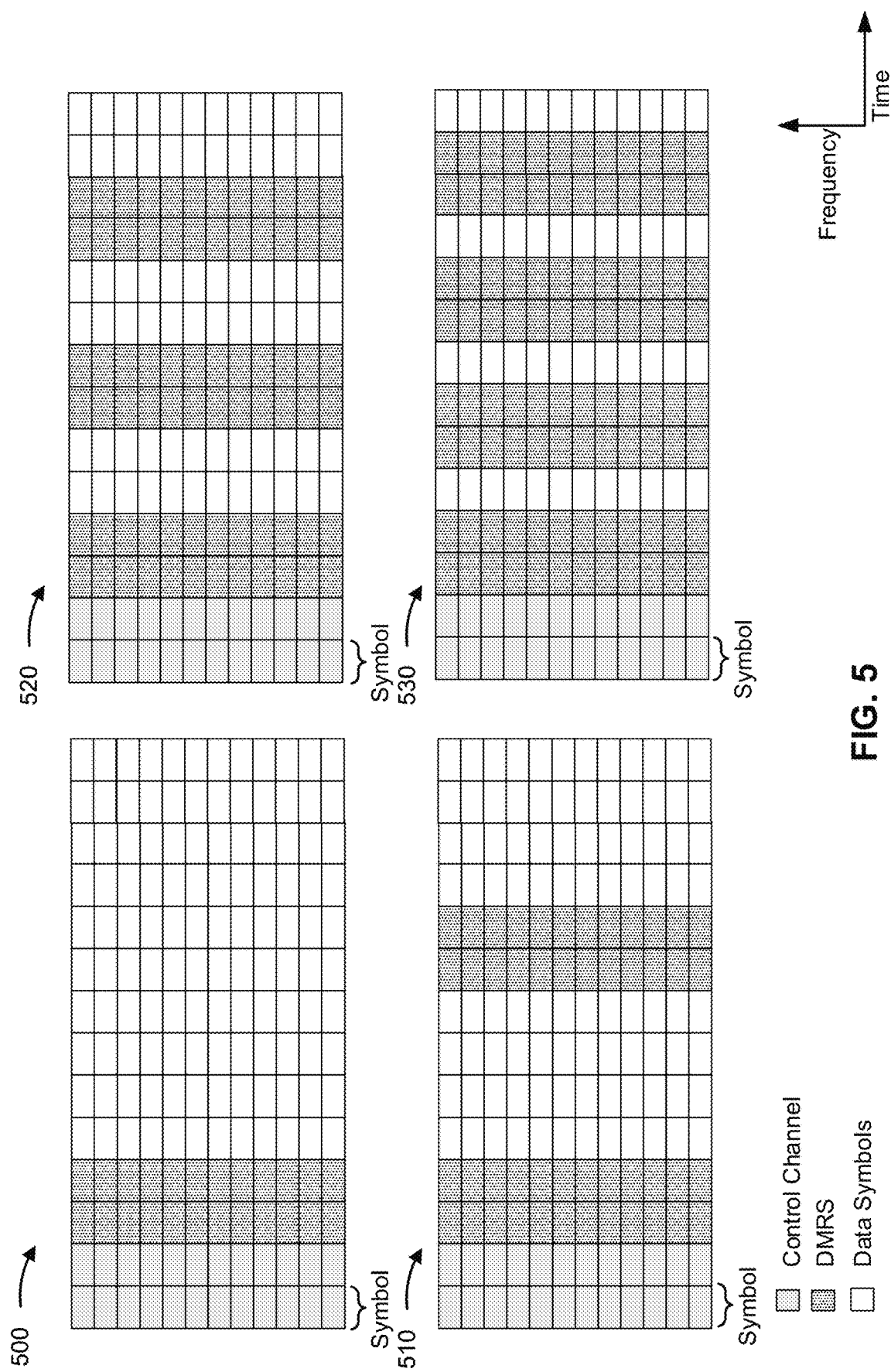

FIG. 5 is a diagram illustrating examples 500, 510, 520, and 530 of DMRS patterns, in accordance with the present disclosure. As described relative to FIG. 5, the DMRS patterns may be used in a data transmission to facilitate channel equalization, demodulation, and/or decoding, among other examples, by a receiving device.

As shown by reference number 500, a communication (e.g., an uplink communication, a downlink communication, and/or a sidelink communication) may include one DMRS occasion that occupies multiple consecutive symbols (e.g., two symbols). As shown, the one DMRS occasion may occupy a first symbol and a second symbol of a data channel (e.g., before a first data symbol of the data channel).

As shown by reference number 510, a communication (e.g., an uplink communication, a downlink communication, and/or a sidelink communication) may include two DMRS occasions. As shown, a first of the two DMRS occasions may occupy a first symbol and a second symbol of a data channel (e.g., before a first data symbol of the data channel), and a second of the two DMRS occasions may occupy subsequent symbols.

As shown by reference number 520, a communication (e.g., an uplink communication, a downlink communication, and/or a sidelink communication) may include three DMRS occasions. As shown, a first of the three DMRS occasions may occupy a first symbol and a second symbol of a data channel (e.g., before a first data symbol of the data channel) and a second and a third of the three DMRS occasions may occupy subsequent symbols.

As shown by reference number 530, a communication (e.g., an uplink communication, a downlink communication, and/or a sidelink communication) may include four DMRS occasions. As shown, a first of the four DMRS occasions may occupy a first symbol and a second symbol of a data channel (e.g., before a first data symbol of the data channel) and a second, a third, and a fourth of the four DMRS occasions may occupy subsequent symbols.

As indicated above, FIG. 5 is provided as an example. Other examples may differ from what is described with regard to FIG. 5.

In some networks, DMRSs may be transmitted within a message to provide a receiving device (e.g., a base station and/or a UE, among other examples) with one or more reference signals to use for a determination of a channel estimation. The receiving device may estimate a channel to improve accuracy of demodulation and/or decoding of the message. The DMRSs may be configured based at least in part on one or more conditions (e.g., channel conditions) to improve a likelihood of accurate channel estimation. For example, locations and/or a number of resources allocated for DMRSs may affect accuracy of channel estimation and spectral efficiency (e.g., more resources allocated for DMRSs may improve accuracy of channel estimation at a cost of resources allocated for data).

In some networks, a base station may provide a configuration of the DMRSs via radio resource control (RRC) signaling. However, the RRC signaling may not be associated with an activation time (e.g., a time measured from receipt of the RRC signaling until the configuration takes effect), which may cause the UE and the base station to be unsynchronized during a transition period. Additionally, RRC signaling may be nonsynchronous and may have a latency of several tens of milliseconds to reconfigure the UE based at least in part on the RRC signaling. For at least this reason, the base station may be unable to dynamically change a configuration of the DMRSs. Instead, some networks use fixed DMRS configurations. However, using a fixed DMRS configuration may limit network flexibility to select a DMRS configuration based at least in part on current network conditions, a current transmission mode, and/or a current state of the UE, among other examples. This may consume network resources by using a configuration with an unnecessarily high number of DMRSs and/or consume computing, network, communication, and power resource to detect and correct errors caused by using a configuration with an insufficient number of DMRSs.

Therefore, some networks may use dynamic DMRS configurations in which a DMRS configuration is selected by a base station based on current network conditions, a current transmission mode, and/or a current state of the UE, among other examples. However, using dynamic DMRS configuration may introduce significant overhead as the base station may be required to dynamically signal a newly selected DMRS configuration (e.g., via a DCI message or a medium access control (MAC) control element (MAC-CE) message) each time the base station determines to dynamically change or update the DMRS configuration. As a result, the use of dynamic DMRS configurations may consume network resources associated with signaling the new DMRS configuration to a UE each time the base station determines to dynamically change or update the DMRS configuration.

Some techniques and apparatuses described herein enable a base station and a UE to operate in a dynamic DMRS mode. "Dynamic DMRS mode" may refer to a mode of operation in which the base station dynamically selects a DMRS configuration (e.g., a DMRS configuration for a downlink channel), but does not explicitly signal dynamically selected DMRS configurations (e.g., the base station may not explicitly signal resource locations, DMRS patterns, resource densities, and/or DMRS sequences for the dynamically selected DMRS configuration). For example, in a dynamic DMRS mode, a UE may be enabled to blindly detect the existence or a presence of a DMRS using a blind detection technique. The UE may be enabled to determine the DMRS configuration based at least in part on detecting the existence or the presence of the DMRS.

In some aspects, the base station may transmit, to the UE, an indication to enter, or to operate in, the dynamic DMRS mode. Therefore, the UE may transition to the dynamic DMRS mode and may blindly detect the presence of DMRSs. In some aspects, the base station may transmit (e.g., in a small sized or single bit transmission) an indication each time a DMRS configuration is updated or changed. This may enable the UE to blindly detect the presence of the DMRS to determine the updated or changed DMRS configuration. In some aspects, the dynamic DMRS mode may be semi-persistent (e.g., the base station and the UE may operate in the dynamic DMRS mode for an amount of time). In some other aspects, the base station may transmit, to the UE, an indication to exit, or to no longer operate in, the dynamic DMRS mode.

As a result, the base station may be enabled to dynamically change or update DMRS configurations without explicitly signaling the changed or updated DMRS configurations to the UE. This may improve a likelihood of accurate channel estimation and may improve spectral efficiency because the base station is enabled to dynamically select the DMRS configuration based at least in part on one or more conditions (e.g., channel conditions). Additionally, the dynamic DMRS mode may reduce a signaling overhead associated with dynamically selecting DMRS configurations because the base station may not explicitly signal new DMRS configurations each time a new DMRS configuration is dynamically selected by the base station.

Figure 6:
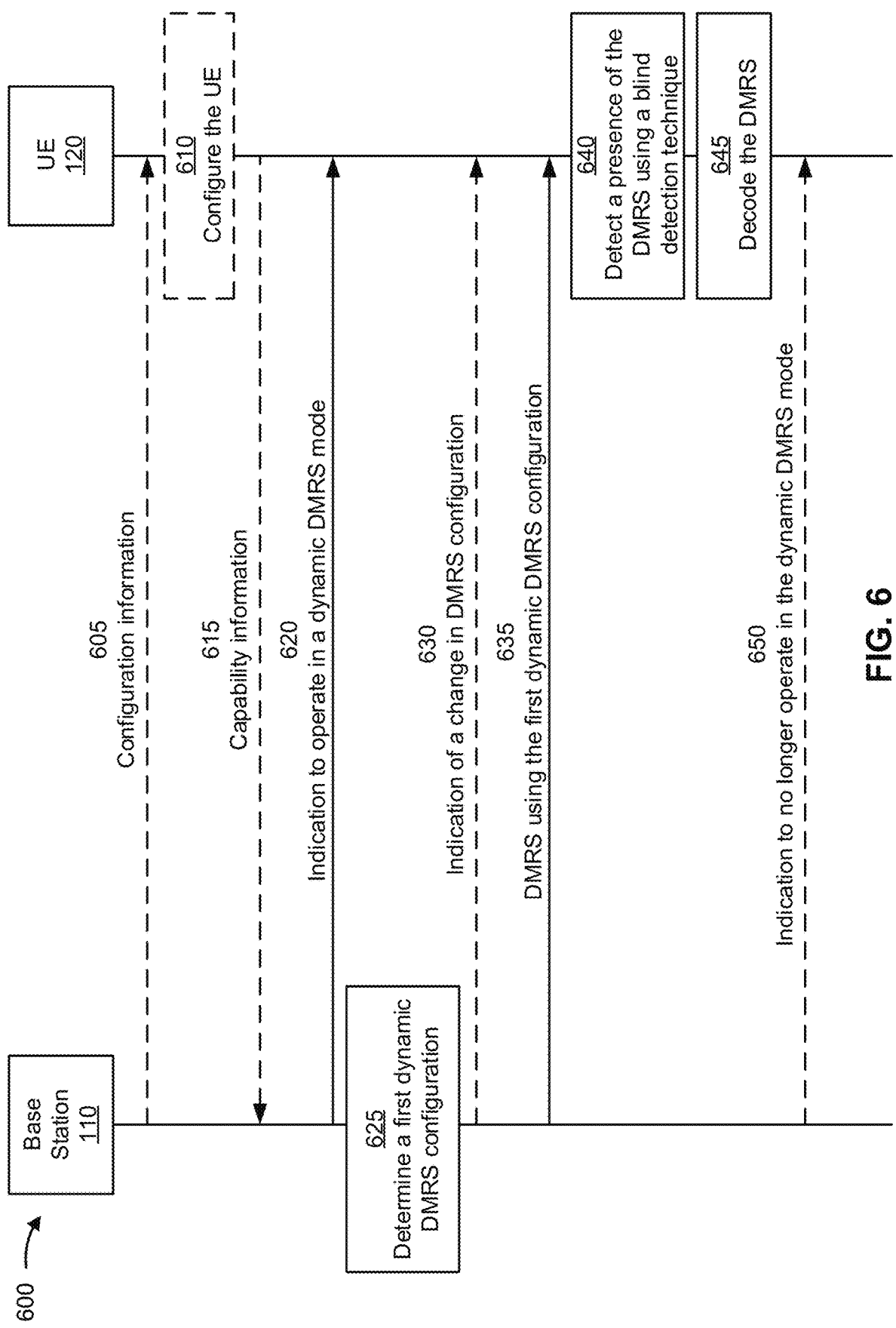
FIGS. 6 and 7 are diagrams illustrating examples associated with signaling for a dynamic DMRS mode, in accordance with the present disclosure.

FIG. 6 is a diagram illustrating an example 600 associated with signaling for a dynamic DMRS mode, in accordance with the present disclosure. As shown in FIG. 6, a base station 110 and a UE 120 may communicate with one another in a wireless network, such as the wireless network 100. As shown in FIG. 6, the base station 110 and the UE 120 may operate in a dynamic DMRS mode that enables the base station 110 to dynamically select DMRS configurations without explicitly signaling the selected DMRS configurations to the UE 120.

As shown by reference number 605, the base station 110 may transmit, and the UE 120 may receive, configuration information. In some aspects, the UE 120 may receive the configuration information via one or more of RRC signaling, MAC-CE signaling, and/or DCI signaling, among other examples. In some aspects, the configuration information may include an indication of one or more configuration parameters (e.g., already known to the UE 120) for selection by the UE 120, and/or explicit configuration information for the UE 120 to use to configure the UE 120, among other examples.

In some aspects, the configuration information may indicate that the UE 120 is to transmit an indication of UE capability (e.g., UE support) to operate in a dynamic DMRS mode. In some aspects, the configuration information may indicate that the UE 120 is to receive an indication of when to operate in the dynamic DMRS mode. In some aspects, the configuration information may indicate that the UE 120 is to receive a DMRS using a dynamic DMRS configuration (e.g., while operating in the dynamic DMRS mode) without receiving an indication of the dynamic DMRS configuration, an indication of DMRS resource locations associated with the dynamic DMRS configuration, and/or an indication of a DMRS pattern or DMRS sequence associated with the dynamic DMRS configuration, among other examples. For example, the configuration information may indicate that the UE 120 (e.g., while operating in the dynamic DMRS mode) is to detect a presence of the DMRS in one or more time domain resources and one or more frequency domain resources of a signal via a blind detection technique or a blind decoding technique. In some aspects, the configuration information may indicate that the UE 120 is to detect the DMRS configuration based at least in part on detecting the presence of the DMRS in one or more time domain resources and one or more frequency domain resources of a signal.

In some aspects, the configuration information may indicate that the UE 120 is to detect a presence of the DMRS (e.g., via a blind detection technique or a blind decoding technique) based at least in part on receiving an indication of a change in DMRS configurations to be used by the base station 110. In some other aspects, the configuration information may indicate that the UE 120 is to detect a presence of the DMRS in one or more (or all) transmission occasions or transmission opportunities. For example, the configuration information may indicate that the UE 120 is to monitor for and/or blindly detect a presence of a DMRS during each slot and/or each symbol while the UE 120 is operating in the dynamic DMRS mode. In some aspects, the configuration information may indicate that the indication to operate in the dynamic DMRS mode is a semi-persistent indication that indicates an amount of time that the UE 120 is to operate in the dynamic DMRS mode. For example, the configuration information may indicate the amount of time that the UE 120 is to operate in the dynamic DMRS mode. In some aspects, the configuration information may indicate that the UE 120 is to exit, or stop operating in, the dynamic DMRS mode based at least in part on receiving, from the base station 110, an indication to no longer operate in the dynamic DMRS mode.

As shown by reference number 610, the UE 120 may configure the UE 120 based at least in part on the configuration information. In some aspects, the UE 120 may be configured to perform one or more operations described herein based at least in part on the configuration information.

As shown by reference number 615, the UE 120 may transmit, and the base station 110 may receive, capability information associated with the UE 120. In some aspects, the capability information may indicate whether the UE 120 supports the dynamic DMRS mode. For example, the capability information may indicate whether the UE 120 supports blindly detecting DMRSs transmitted by the base station 110. In some aspects, the base station 110 may configure the UE 120 to operate in the dynamic DMRS mode based at least in part on the capability information. For example, if the UE 120 transmits an indication that the UE 120 supports the dynamic DMRS mode, then the base station 110 may configure the UE 120 to operate in the dynamic DMRS mode in some scenarios. Alternatively, if the UE 120 transmits an indication that the UE 120 does not support the dynamic DMRS mode, then the base station 110 may refrain from configuring the UE 120 to operate in the dynamic DMRS mode.

As shown by reference number 620, the base station 110 may transmit, and the UE 120 may receive, an indication to operate in the dynamic DMRS mode. As described elsewhere herein, the dynamic DMRS mode may include the use of dynamic DMRS configurations without an explicit indication of DMRS resource locations for the dynamic DMRS configurations. "Dynamic DMRS configuration" may refer to a DMRS configuration that is dynamically selected (e.g., by the base station 110) based at least in part on one or more channel conditions or other factors. In some aspects, a dynamic DMRS configuration may be a DMRS configuration that is dynamically selected by the base station 110 and is not explicitly indicated to the UE 120. For example, a DMRS resource location, a DMRS pattern, a DMRS sequence, and/or a resource density, among other examples, for the dynamic DMRS configuration may not be indicated to the UE 120. In some aspects, the base station 110 may transmit the indication to operate in the dynamic DMRS mode via an RRC message, a MAC-CE message, and/or a DCI message, among other examples.

In some aspects, the indication to operate in the dynamic DMRS mode may be a semi-persistent indication and/or the dynamic DMRS mode may be semi-persistent. For example, the dynamic DMRS mode may be associated with an amount of time that the UE 120 (and the base station 110) is to operate in the dynamic DMRS mode. In some aspects, the amount of time may be indicated by the indication to operate in the dynamic DMRS mode. In some other aspects, the amount of time may be indicated in another message, such as in the configuration information.

In some aspects, prior to receiving the indication to operate in the dynamic DMRS mode, the base station 110 and the UE 120 may operate in a static DMRS mode. "Static DMRS mode" may refer to a mode of operation in which fixed DMRS configurations (e.g., RRC configured DMRS configurations) are used. For example, in a static DMRS mode, the base station 110 may signal (e.g., using RRC signaling), to the UE 120, a DMRS configuration (e.g., DMRS resource location(s), DMRS pattern(s), and/or DMRS sequence(s)) that is to be used by the base station 110.

The transmission of the indication to operate in the dynamic DMRS mode may trigger the base station 110 to operate in the dynamic DMRS mode. Similarly, the reception of the indication to operate in the dynamic DMRS mode may trigger the UE 120 to operate in the dynamic DMRS mode. For example, based at least in part on receiving the indication to operate in the dynamic DMRS mode, the UE 120 may transition from operating in a static DMRS mode to operating in a dynamic DMRS mode. In other words, based at least in part on receiving the indication to operate in the dynamic DMRS mode, the UE 120 may begin to monitor for and/or blindly detect the presence of DMRSs transmitted by the base station 110, as described in more detail elsewhere herein.

As shown by reference number 625, the base station 110 may determine a first dynamic DMRS configuration. For example, the base station 110 (e.g., while operating in the dynamic DMRS mode) may determine that a DMRS configuration used by the base station 110 should be changed. For example, the base station 110 may determine the first dynamic DMRS configuration based at least in part on one or more channel conditions (e.g., experienced by the UE 120 and/or measured by the base station 110). For example, the one or more channel conditions may include a signal-to-noise ratio (SNR) of the channel, and/or a bandwidth or frequency domain allocation used by a communication transmitted by the base station 110, among other examples.

For example, the base station 110 may determine the first dynamic DMRS configuration based at least in part on one or more spectral efficiency maximization criteria that are based at least in part on channel characteristics. For example, the base station 110 may determine the first dynamic DMRS configuration based at least in part on an average post processing of signal-to-interference-plus-noise ratio (SINR) per data resource element per stream, a delay spread, Doppler characteristics, an input SNR (or an SNR set point for the UE 120), and/or parameters of one or more candidate DMRS configurations (e.g., a time-domain density, a frequency-domain density, and/or an available power boost for DMRS resources), among other examples.

The base station 110 may refrain from transmitting, to the UE 120, an indication of the first dynamic DMRS configuration based at least in part on transmitting the indication to operate in the dynamic DMRS mode. For example, because the base station 110 and/or the UE 120 are operating in the dynamic DMRS mode, the base station 110 may not transmit an indication of the first dynamic DMRS configuration (e.g., after determining that the first dynamic DMRS configuration is to be used by the base station 110).

In some aspects, as shown by reference number 630, the base station 110 may transmit, and the UE 120 may receive, an indication of a change in DMRS configurations to be used by the base station 110. For example, based at least in part on dynamically selecting the first dynamic DMRS configuration, the base station 110 may transmit, to the UE 120, an indication that the DMRS configuration used by the base station 110 is to be changed. For example, the indication of the change in DMRS configurations may not indicate the first dynamic DMRS configuration, but may notify the UE 120 that the DMRS configuration is to be changed (e.g., to enable the UE 120 to begin monitoring for the DMRS using a blind detection technique). For example, the indication of the change in DMRS configurations may be a small sized message or a single bit message notifying the UE 120 that the DMRS configuration used by the base station 110 has changed. In some aspects, the base station 110 may transmit the indication of the change in DMRS configurations via an RRC message, a MAC-CE message, and/or a DCI message, among other examples. Transmitting the indication of the change in DMRS configurations may reduce an overhead associated with the UE 120 performing blind detection as the UE 120 may be enable to only perform the blind detection based at least in part on receiving the indication of the change in DMRS configurations (e.g., rather than performing blind detection of all DMRSs transmitted by the base station 110). In other words, the UE 120 may perform a blind detection of the DMRS and/or the first dynamic DMRS configuration (as explained in more detail elsewhere herein) based at least in part on receiving the indication of the change in DMRS configurations. The UE 120 may assume that the first dynamic DMRS configuration is to be used by the base station 110 until the UE 120 receives another indication of a change in DMRS configurations.

In some other aspects, the base station 110 may not transmit the indication of the change in DMRS configurations. For example, while operating in the dynamic DMRS mode, the UE 120 may be expected to monitor for and/or perform blind detection of all DMRSs transmitted by the base station 110. In other words, the UE 120 may be expected to perform blind detection of DMRSs in each slot and/or in each symbol while operating in the dynamic DMRS mode, as explained in more detail elsewhere herein.

As shown by reference number 635, the base station 110 may transmit, and the UE 120 may receive, a signal that includes a DMRS that uses the first dynamic DMRS configuration. For example, the base station 110 may transmit the DMRS using a DMRS pattern, DMRS sequence, and/or resource density, among other examples, that is associated with, or defined by, the first dynamic DMRS configuration.

As shown by reference number 640, the UE 120 may detect a presence of the DMRS transmitted by the base station 110 in one or more time domain resources and one or more frequency domain resources of a signal via a blind detection technique. As used herein, the terms "blind detect," "blind detection," and/or "blind detecting" may refer to the UE 120 attempting to decode a DMRS based at least in part on one or more assumptions or hypothesis (e.g., without receiving an indication of a time-frequency resource location for the DMRS). For example, the one or more assumptions or hypothesis may be a set of known (e.g., known by the UE 120) DMRS configurations. In some aspects, the set of known DMRS configurations may be indicated by the base station 110 (e.g., in the configuration information or in another message). In some aspects, the UE 120 may determine the set of known DMRS configurations. For example, the set of known DMRS configurations may be defined, or otherwise fixed, by a wireless communication standard, such as the 3GPP. In some aspects, the set of known DMRS configurations (e.g., that are available to be used during the dynamic DMRS mode) may be a subset of available DMRS configurations that could be used by the base station 110 and/or the UE 120. Using a subset of available DMRS configurations for the dynamic DMRS mode may reduce a blind detection complexity for the UE 120 (e.g., because the number of possible assumptions or hypothesis to be used by the UE 120 is reduced).

For example, the UE 120 may detect the first dynamic DMRS configuration, from the set of known DMRS configurations, using a blind detection technique (e.g., the first dynamic DMRS mode may be included in the set of known DMRS configurations). For example, each of the known DMRS configurations may have a known DMRS pattern or sequence (e.g., the UE 120 may know symbols that are to include a DMRS for each of the known DMRS configurations, for example, as depicted and described in connection with FIGS. 4 and 5). Therefore, the UE 120 may detect a presence of a DMRS (e.g., using a blind detection technique) in one or more symbols. The UE 120 may determine whether the symbols in which a DMRS is detected matches a known DMRS pattern or sequence of a known DMRS configuration. The UE 120 may determine the first dynamic DMRS configuration based at least in part on detecting the presence of DMRSs in symbols corresponding to the DMRS pattern or sequence of the first dynamic DMRS configuration. In other words, the UE 120 may detect the first dynamic DMRS configuration based at least in part on detecting the presence of the DMRS in the one or more time domain resources and the one or more frequency domain resources of the signal (e.g., via a blind detection technique).

For example, the UE 120 may detect a presence of a DMRS in a symbol (e.g., in the time domain) and/or a subcarrier (e.g., in the frequency domain). The UE 120 may be enabled to detect the presence of the DMRS due to a processing gain achieved through a size of the frequency domain allocation of a signal (e.g., a number of resource blocks allocated for a signal). For example, a DMRS may use a known (e.g., known to the UE 120) code sequence and/or a known modulation scheme. Therefore, to detect the presence of a DMRS in a symbol, the UE 120 may only need to detect the presence of a DMRS in one or more subcarriers from all subcarriers allocated for the signal (e.g., in a symbol) to detect that a DMRS is present in the symbol. Therefore, the processing overhead for detecting the presence of the DMRS may be minimal, even in low SNR conditions (e.g., as an MCS in low SNR conditions is typically lower and as a result the resource allocation is typically larger). For example, the processing gain may be achieved by averaging over the available allocation (e.g., over all subcarriers allocated for a signal) in a symbol to detect a presence of the DMRS in the symbol (e.g., in one of the subcarriers allocated for the signal in the symbol).

For example, a known DMRS configuration may include DMRSs in particular symbols (e.g., in accordance with a DMRS pattern or sequence in the time domain). Therefore, the UE 120 may be enabled to detect a presence (or the absence) of a DMRS in different symbols to determine the DMRS configuration used by the base station 110. For example, the UE 120 may not be required to blindly detect the location of each DMRS resource transmitted by the base station 110, but rather may only be required to detect the presence of a DMRS in certain symbols or subcarriers to identify a valid DMRS configuration.

In some aspects, the UE 120 may blindly detect the DMRS configuration based at least in part on performing a correlation between the received signal and a known DMRS sequence or pattern (e.g., an assumption or a hypothesis) in the frequency domain. For example, the UE 120 may multiply the amplitude of the received signal (e.g., the energy of the received signal) by the amplitude of a signal using a known DMRS sequence or pattern (e.g., the UE 120 may take the conjugate of the received signal and the signal that uses the known DMRS sequence or pattern) and may sum the squared amplitudes to obtain a value. The UE 120 may use the value to determine whether a DMRS is present in a particular symbol of the received signal. For example, if the value is greater than or equal to a decision threshold, then the UE 120 may determine that a DMRS is present in the received signal (or symbol). If the value is less than the decision threshold, then the UE 120 may determine that a DMRS is not present in the received signal (or symbol). In some aspects, a value of the decision threshold may be based at least in part on an SNR experienced by the UE 120 and a size of a coherence bandwidth. "Coherence bandwidth" may refer to an approximate bandwidth or frequency interval over which two frequencies of a signal are likely to experience comparable or correlated amplitude fading. For example, a coherence bandwidth may be one or more resource blocks over which a phase of a signal is the same or within a threshold difference (e.g., between the one or more resource blocks). In some aspects, an accuracy of the blind detection by the UE 120 may be a function of the size of the coherence bandwidth and the SNR experienced by the UE 120. A size of the coherence bandwidth for a channel may be based at least in part on a delay spread or a Doppler parameter (e.g., Doppler shift or Doppler spread). For example, an accuracy of the blind detection by the UE 120 may be optimal when the channel is approximately following an additive white Gaussian noise (AWGN) model.

In some aspects, the detection process used by the UE 120 may assume that the bandwidth of the signal is a coherence bandwidth. However, in some aspects, a channel may experience conditions that cause certain portions of the frequency allocation of a signal transmitted over the channel to experience different phases or different fading conditions. For example, the channel may be associated with a sampling time offset or a large delay spread. In such examples, the UE 120 may determine portions of the bandwidth of the signal that are coherent. For example, the UE 120 may determine a first coherence bandwidth of the signal (e.g., a first set of resource blocks of the signal) and may determine a second coherence bandwidth of the signal (e.g., a second set of resource blocks of the signal). The UE 120 may perform a blind detection technique using a first coherence bandwidth of a signal and a second coherence bandwidth of the signal to detect the first dynamic DMRS configuration.

For example, the UE 120 may multiply the amplitude of the received signal (e.g., the energy of the received signal) by the amplitude of the known DMRS sequence or pattern (e.g., the UE 120 may take the conjugate of the received signal and the known DMRS sequence or pattern). However, rather than summing the squared amplitudes for the entire bandwidth of the signal, the UE 120 may sum each coherence bandwidth (e.g., the first coherence bandwidth and the second coherence bandwidth) separately or independently. As a result, different portions of the frequency allocation of the signal that are experiencing different conditions may not impact one another in the blind detection process performed by the UE 120. The sums of each coherence bandwidth may then be summed together to obtain a value (e.g., in a similar manner as described above). Therefore, the UE 120 may be enabled to detect a presence of a DMRS and/or a DMRS configuration when a bandwidth of a signal is not coherent (e.g., in phase or fading conditions). In some aspects, the UE 120 may determine the coherence bandwidth(s) for a signal based at least in part on channel conditions measured by the UE 120. In some other aspects, the base station 110 may indicate, to the UE 120, a size of the coherence bandwidth for the signal.

As shown by reference number 645, the UE 120 may decode the DMRS based at least in part on detecting the presence of the DMRS. For example, the UE 120 may detect the presence of the DMRS in one or more symbols. Based at least in part on the symbols in which a DMRS is detected, the UE 120 may determine the first dynamic DMRS configuration used for the DMRS. As a result, the UE 120 may be enabled to receive and successfully decode the DMRS. Detecting the DMRS configuration and successfully decoding the DMRS may enable the UE 120 to perform channel equalization, demodulation, channel estimation, and/or decoding, among other examples, for a data transmission.

In some aspects, the base station 110 may determine a second dynamic DMRS configuration (e.g., that is different than the first dynamic DMRS configuration) while operating in the dynamic DMRS mode. For example, the base station 110 may determine the second dynamic DMRS configuration based at least in part on changing channel conditions (e.g., in a similar manner as described elsewhere herein). The base station 110 may switch from using the first dynamic DMRS configuration to using the second dynamic DMRS configuration without notifying the UE 120. For example, the base station 110 may not indicate, to the UE 120, a DMRS resource location, a DMRS pattern, or a DMRS sequence associated with the second dynamic DMRS configuration. In some aspects, the base station 110 may transmit, to the UE 120, an indication of a change in DMRS configurations used by the base station 110 (e.g., in a similar manner as described above). The base station 110 may refrain from transmitting, to the UE 120, an indication of the second dynamic DMRS configuration (e.g., based at least in part on operating in the dynamic DMRS mode). The base station 110 may transmit, and the UE 120 may receive, a second DMRS (e.g., an additional DMRS) using the second dynamic DMRS configuration. The UE 120 may detect a presence of the DMRS and/or detect the second dynamic DMRS configuration using a blind detection technique (e.g., in a similar manner as described elsewhere herein). As a result, the base station 110 may be enable to dynamically (e.g., "on the fly") change DMRS configurations used by the base station 110 without introducing a large signaling overhead associated with signaling a new DMRS configuration each time the DMRS configuration is changed by the base station 110. Using a dynamic DMRS configuration may conserve network resources that would have otherwise been used by using a DMRS configuration with an unnecessarily high number of DMRSs and/or may conserve computing, network, communication, and power resource that would have otherwise been used to detect and correct errors caused by using a DMRS configuration with an insufficient number of DMRSs.

As shown by reference number 650, in some aspects, the base station 110 may transmit, and the UE 120 may receive, an indication to no longer operate in the dynamic DMRS mode. For example, the base station 110 may signal to the UE 120 when the UE 120 is to transition from operating in the dynamic DMRS mode to operating in a static DMRS mode. Alternatively, the base station 110 may not transmit the indication to no longer operate in the dynamic DMRS mode and the UE 120 may determine to transition to operating in the static DMRS mode after an amount of time expires (e.g., the amount of time indicated by the base station 110, as described in more detail elsewhere herein).

As indicated above, FIG. 6 is provided as an example. Other examples may differ from what is described with respect to FIG. 6.

Figure 7:
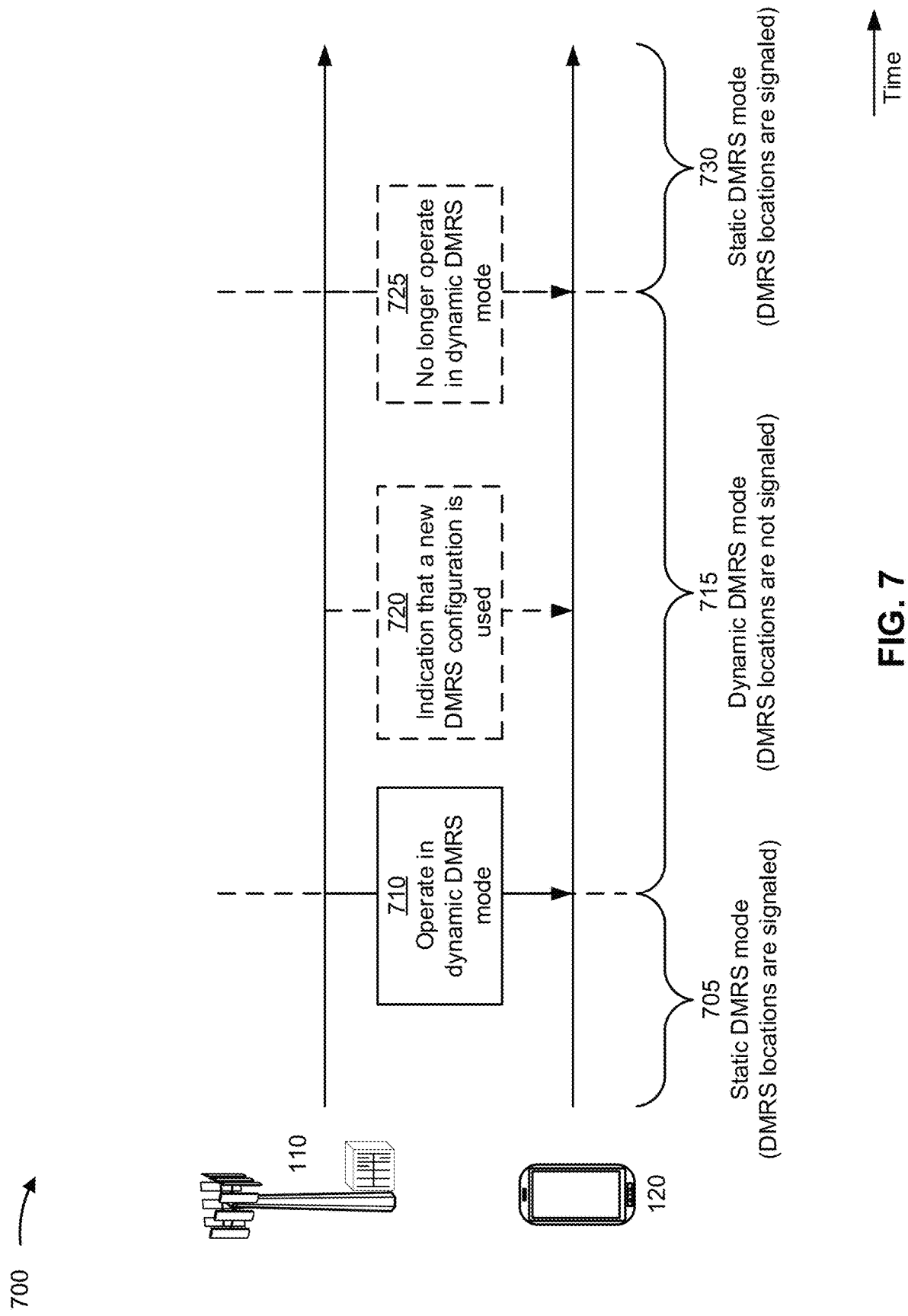

FIG. 7 is a diagram illustrating an example 700 associated with signaling for a dynamic DMRS mode, in accordance with the present disclosure. As shown in FIG. 7, a base station 110 and a UE 120 may communicate with one another in a wireless network, such as the wireless network 100. As shown in FIG. 7, the base station 110 and the UE 120 may operate in a dynamic DMRS mode that enables the base station 110 to dynamically select DMRS configurations without explicitly signaling the selected DMRS configurations to the UE 120.

For example, as shown by reference number 705, during a first time period, the UE 120 and the base station 110 may operate in a static DMRS mode. The static DMRS mode may be associated with the base station 110 signaling DMRS locations to the UE 120. In other words, the base station 110 may explicitly signal (e.g., via RRC signaling) DMRS configurations that are to be used by the base station 110.

As shown by reference number 710, the base station 110 may transmit, and the UE 120 may receive, an indication to operate in a dynamic DMRS mode. For example, the dynamic DMRS mode may be associated with the base station 110 refraining from signaling (e.g., not signaling) DMRS locations to the UE 120. In other words, the base station 110 may not explicitly signal (e.g., via RRC signaling or other signaling) DMRS configurations that are to be used by the base station 110.

As shown by reference number 715, based at least in part on the indication to operate in the dynamic DMRS mode, the UE 120 and the base station 110 may operate in the dynamic DMRS mode during a second time period. The UE 120 and the base station 110 may operate in the dynamic DMRS mode in a similar manner as described above in connection with FIG. 6. For example, the base station 110 may dynamically select DMRS configurations based at least in part on channel conditions or an SNR set point of the UE 120. The base station 110 may refrain from transmitting, to the UE 120, an indication of DMRS resource locations (e.g., from transmitting an indication of the actual DMRS configuration) for the dynamically selected DMRS configurations during the dynamic DMRS mode.

The UE 120 may blindly detect the presence of DMRSs in signals transmitted by the base station 110 while operating in the dynamic DMRS mode, in a similar manner as described above in connection with FIG. 6. For example, the UE 120 may detect a DMRS configuration used by the base station 110 based at least in part on blindly detecting the presence of DMRSs in signals transmitted by the base station 110. In some aspects, as shown by reference number 720, the base station 110 may transmit, and the UE 120 may receive, an indication that a new DMRS configuration is used. For example, when the base station 110 determines to switch or change a DMRS configuration while operating in the dynamic DMRS mode, the base station 110 may transmit the indication that a new DMRS configuration is used. This may enable the UE 120 to begin to perform a blind detection to detect the new DMRS configuration (e.g., and may conserve resources and processing overhead that would have otherwise been used by the UE 120 to perform a blind detection for DMRSs for all signals transmitted by the base station 110 while operating in the dynamic DMRS mode).

As shown by reference number 725, in some aspects, the base station 110 may transmit, and the UE 120 may receive, an indication to no longer operate in the dynamic DMRS mode. Alternatively, the base station 110 and/or the UE 120 may determine to no longer operate in the dynamic DMRS mode an amount of time after the indication to operate in the dynamic DMRS mode (e.g., described above in connection with reference number 710). As shown by reference number 730, during a third time period, the UE 120 and the base station 110 may operate in a static DMRS mode. For example, the UE 120 and/or the base station 110 may transition from operating in the dynamic DMRS mode to operating in the static DMRS mode (e.g., in which DMRS resource locations are explicitly signaled by the base station 110 to the UE 120).

As indicated above, FIG. 7 is provided as an example. Other examples may differ from what is described with respect to FIG. 7.

Figure 8:
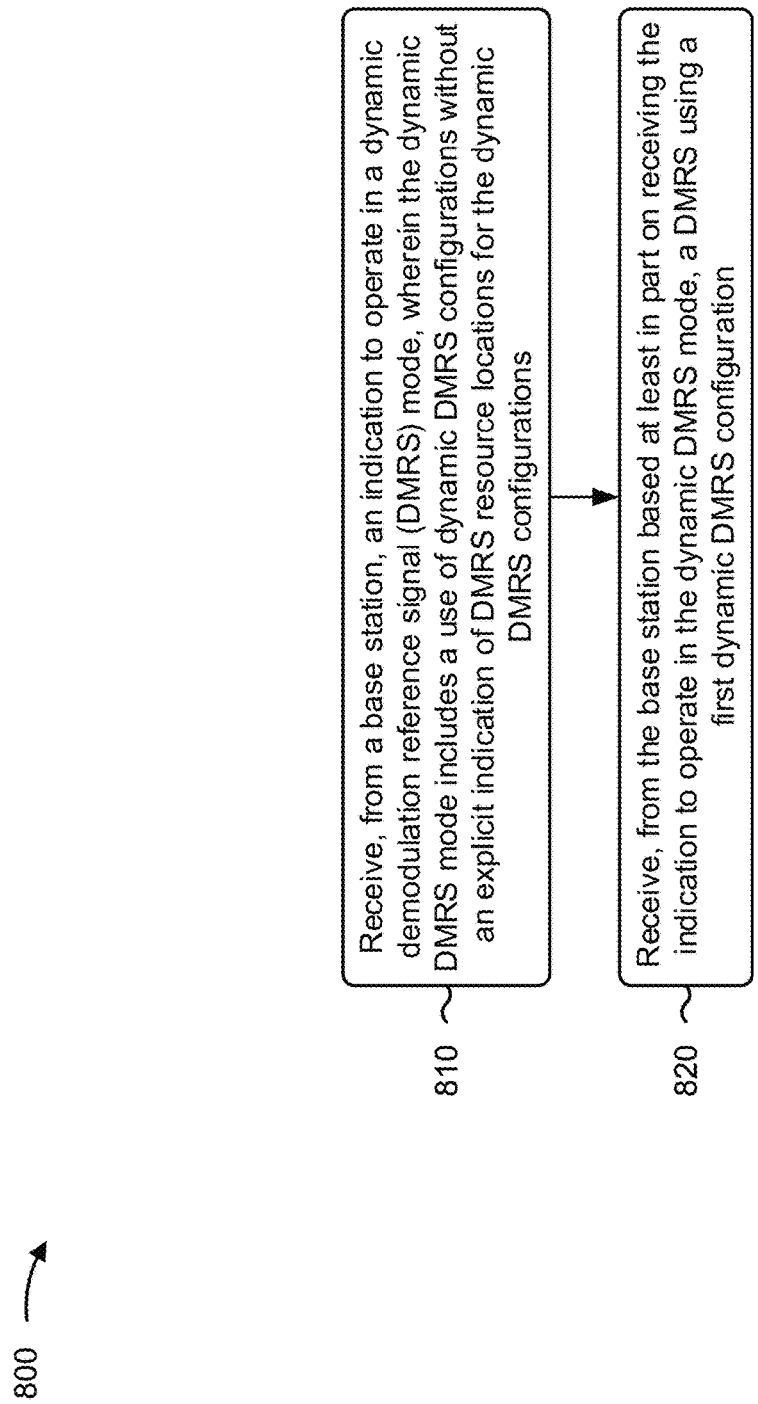
FIGS. 8 and 9 are diagrams illustrating example processes associated with signaling for a dynamic DMRS mode, in accordance with the present disclosure.

FIG. 8 is a diagram illustrating an example process 800 performed, for example, by a UE, in accordance with the present disclosure. Example process 800 is an example where the UE (e.g., UE 120) performs operations associated with signaling for a dynamic DMRS mode.

As shown in FIG. 8, in some aspects, process 800 may include receiving, from a base station, an indication to operate in a dynamic DMRS mode, wherein the dynamic DMRS mode includes a use of dynamic DMRS configurations without an explicit indication of DMRS resource locations for the dynamic DMRS configurations (block 810). For example, the UE (e.g., using communication manager 140 and/or reception component 1002, depicted in FIG. 10) may receive, from a base station, an indication to operate in a dynamic DMRS mode, wherein the dynamic DMRS mode includes a use of dynamic DMRS configurations without an explicit indication of DMRS resource locations for the dynamic DMRS configurations, as described above (for example, as described in connection with FIGS. 6 and 7).

As further shown in FIG. 8, in some aspects, process 800 may include receiving, from the base station based at least in part on receiving the indication to operate in the dynamic DMRS mode, a DMRS using a first dynamic DMRS configuration (block 820). For example, the UE (e.g., using communication manager 140 and/or reception component 1002, depicted in FIG. 10) may receive, from the base station based at least in part on receiving the indication to operate in the dynamic DMRS mode, a DMRS using a first dynamic DMRS configuration, as described above (for example, as described in connection with FIGS. 6 and 7).

Process 800 may include additional aspects, such as any single aspect or any combination of aspects described below and/or in connection with one or more other processes described elsewhere herein.

In a first aspect, process 800 includes detecting a presence of the DMRS in one or more time domain resources and one or more frequency domain resources of a signal via a blind detection technique, and detecting the first dynamic DMRS configuration based at least in part on detecting the presence of the DMRS in the one or more time domain resources and the one or more frequency domain resources of the signal.

In a second aspect, alone or in combination with the first aspect, the dynamic DMRS mode is associated with a set of DMRS configurations, and receiving the DMRS includes detecting the first dynamic DMRS configuration, from the set of DMRS configurations, using a blind detection technique, and receiving the DMRS based at least in part on detecting the first dynamic DMRS configuration.

In a third aspect, alone or in combination with one or more of the first and second aspects, process 800 includes performing, based at least in part on receiving the indication to operate in the dynamic DMRS mode, a blind detection technique at each symbol and in each slot while operating in the dynamic DMRS mode to detect the dynamic DMRS configurations used by the base station.

In a fourth aspect, alone or in combination with one or more of the first through third aspects, the indication to operate in the dynamic DMRS mode is a semi-persistent indication that indicates an amount of time that the UE is to operate in the dynamic DMRS mode.

In a fifth aspect, alone or in combination with one or more of the first through fourth aspects, process 800 includes receiving, from the base station, an indication to no longer operate in the dynamic DMRS mode.

In a sixth aspect, alone or in combination with one or more of the first through fifth aspects, process 800 includes receiving, from the base station, an additional DMRS using a second dynamic DMRS configuration, where a resource allocation or a DMRS pattern for the second dynamic DMRS configuration is not indicated to the UE.

In a seventh aspect, alone or in combination with one or more of the first through sixth aspects, process 800 includes performing, based at least in part on receiving the indication to operate in the dynamic DMRS mode, a blind detection technique using a first coherence bandwidth of a signal and a second coherence bandwidth of the signal to detect the first dynamic DMRS configuration.

In an eighth aspect, alone or in combination with one or more of the first through seventh aspects, receiving the indication to operate in the dynamic DMRS mode includes receiving the indication to operate in the dynamic DMRS mode via at least one of a radio resource control message, a MAC-CE message, or a downlink control information message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
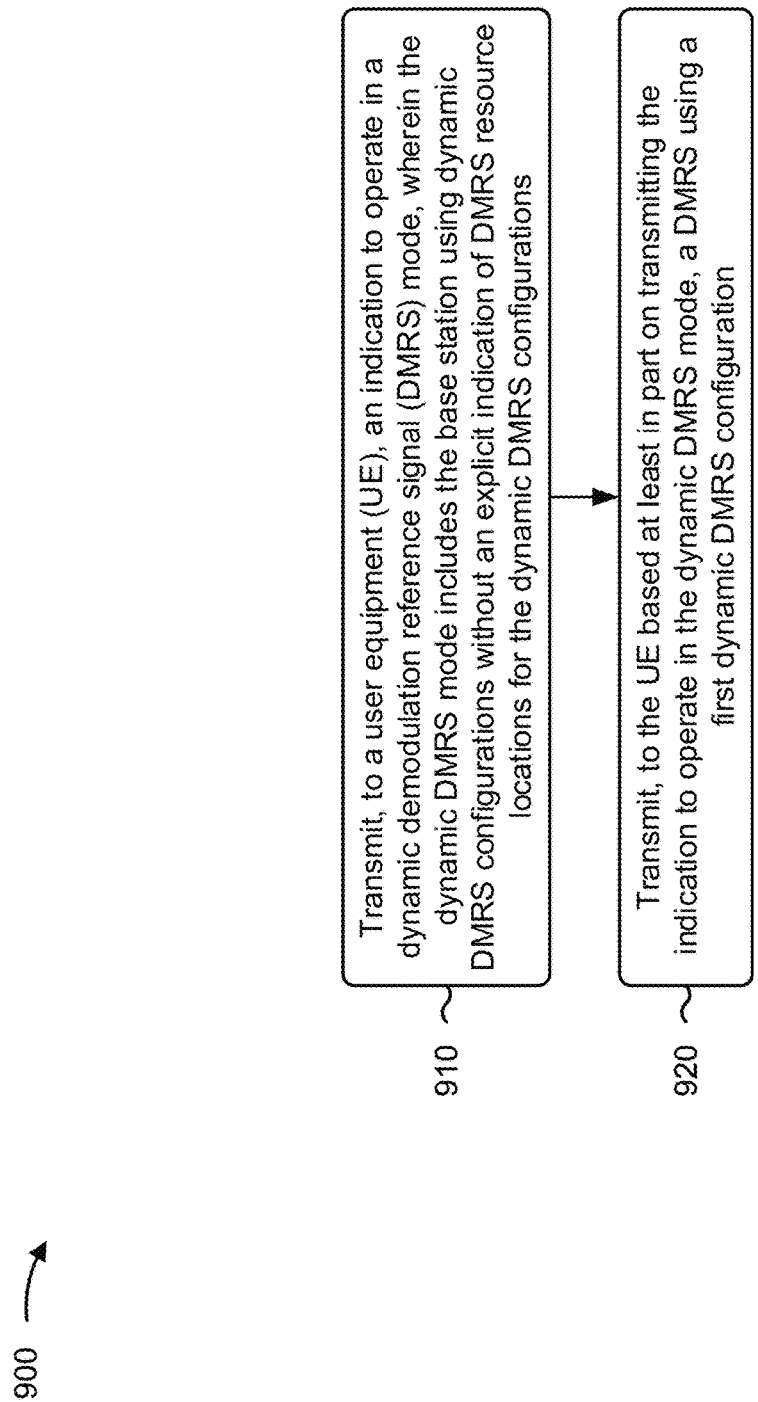

FIG. 9 is a diagram illustrating an example process 900 performed, for example, by a base station, in accordance with the present disclosure. Example process 900 is an example where the base station (e.g., base station 110) performs operations associated with signaling for a dynamic DMRS mode.

As shown in FIG. 9, in some aspects, process 900 may include transmitting, to a UE, an indication to operate in a dynamic DMRS mode, wherein the dynamic DMRS mode includes the base station using dynamic DMRS configurations without an explicit indication of DMRS resource locations for the dynamic DMRS configurations (block 910). For example, the base station (e.g., using communication manager 150 and/or transmission component 1104, depicted in FIG. 11) may transmit, to a UE, an indication to operate in a dynamic DMRS mode, wherein the dynamic DMRS mode includes the base station using dynamic DMRS configurations without an explicit indication of DMRS resource locations for the dynamic DMRS configurations, as described above (for example, as described in connection with FIGS. 6 and 7).

As further shown in FIG. 9, in some aspects, process 900 may include transmitting, to the UE based at least in part on transmitting the indication to operate in the dynamic DMRS mode, a DMRS using a first dynamic DMRS configuration (block 920). For example, the base station (e.g., using communication manager 150 and/or transmission component 1104, depicted in FIG. 11) may transmit, to the UE based at least in part on transmitting the indication to operate in the dynamic DMRS mode, a DMRS using a first dynamic DMRS configuration, as described above (for example, as described in connection with FIGS. 6 and 7).

Process 900 may include additional aspects, such as any single aspect or any combination of aspects described below and/or in connection with one or more other processes described elsewhere herein.

In a first aspect, process 900 includes determining the first dynamic DMRS configuration based at least in part on one or more channel conditions experienced by the UE, and refraining from transmitting an indication of the first dynamic DMRS configuration based at least in part on transmitting the indication to operate in the dynamic DMRS mode.

In a second aspect, alone or in combination with the first aspect, the dynamic DMRS mode is associated with a set of DMRS configurations, and transmitting the DMRS includes transmitting the DMRS the first dynamic DMRS configuration that is included in the set of DMRS configurations.

In a third aspect, alone or in combination with one or more of the first and second aspects, process 900 includes determining to change from the first dynamic DMRS configuration to a second dynamic DMRS configuration, and transmitting, to the UE, an indication of a change in DMRS configurations to be used by the base station, and transmitting the DMRS includes transmitting, to the UE, the DMRS using the second dynamic DMRS configuration.

In a fourth aspect, alone or in combination with one or more of the first through third aspects, the indication to operate in the dynamic DMRS mode is a semi-persistent indication that indicates an amount of time that the UE is to operate in the dynamic DMRS mode.

In a fifth aspect, alone or in combination with one or more of the first through fourth aspects, process 900 includes transmitting, to the UE, an indication to no longer operate in the dynamic DMRS mode.

In a sixth aspect, alone or in combination with one or more of the first through fifth aspects, process 900 includes determining to change from the first dynamic DMRS configuration to a second dynamic DMRS configuration, refraining from transmitting an indication of the second dynamic DMRS configuration, and transmitting, to the UE, an additional DMRS using the second dynamic DMRS configuration.

In a seventh aspect, alone or in combination with one or more of the first through sixth aspects, transmitting the indication to operate in the dynamic DMRS mode includes transmitting the indication to operate in the dynamic DMRS mode via at least one of a radio resource control message, a MAC-CE message, or a downlink control information message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
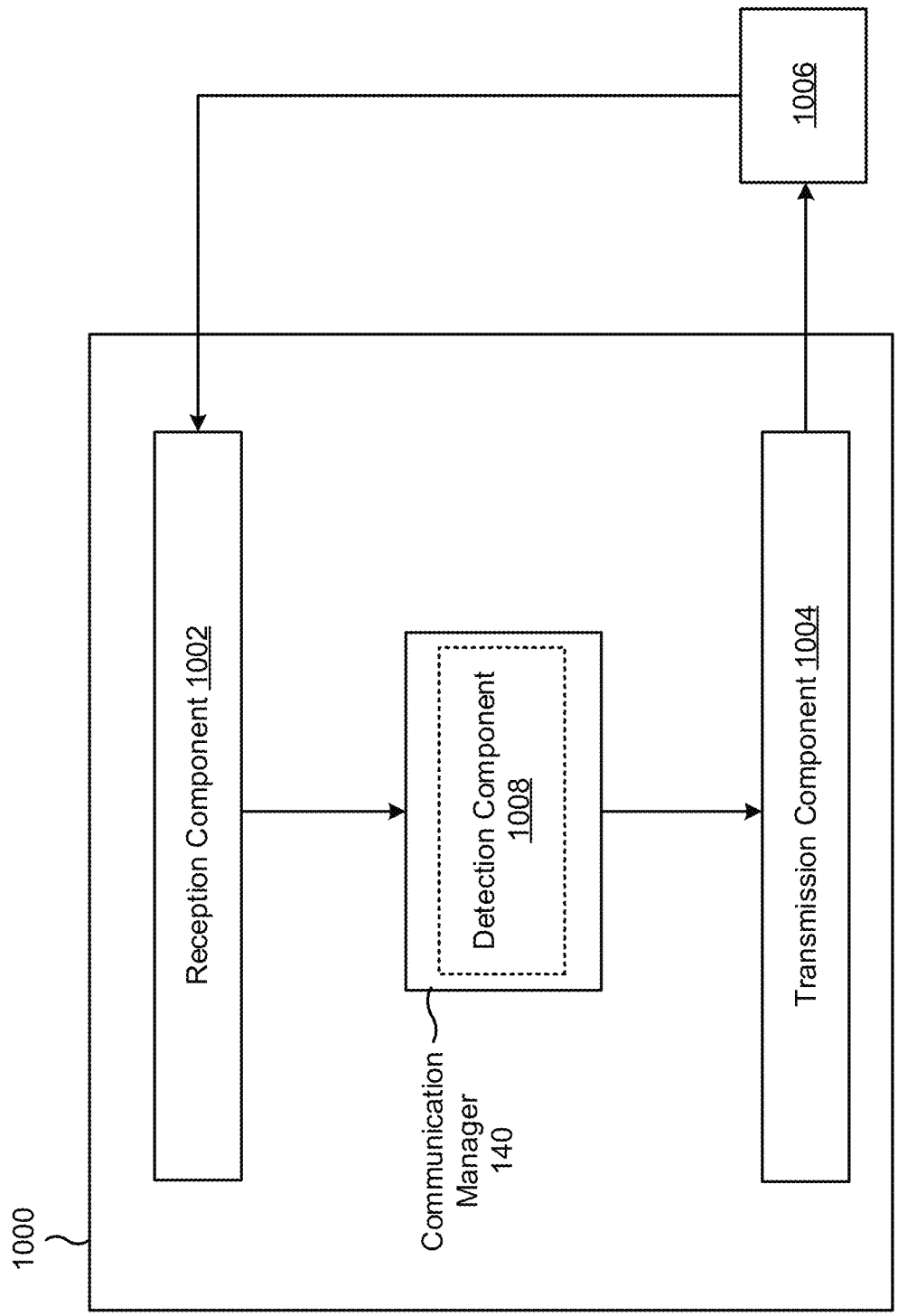
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a detection component 1008, among other examples.

In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station, an indication to operate in a dynamic DMRS mode, wherein the dynamic DMRS mode includes a use of dynamic DMRS configurations without an explicit indication of DMRS resource locations for the dynamic DMRS configurations. The reception component 1002 may receive, from the base station based at least in part on receiving the indication to operate in the dynamic DMRS mode, a DMRS using a first dynamic DMRS configuration.

The detection component 1008 may detect a presence of the DMRS in one or more time domain resources and one or more frequency domain resources of a signal via a blind detection technique. The detection component 1008 may detect the first dynamic DMRS configuration based at least in part on detecting the presence of the DMRS in the one or more time domain resources and the one or more frequency domain resources of the signal.

The reception component 1002 may receive, from the base station, an indication of a change in DMRS configurations to be used by the base station.

The detection component 1008 may perform, based at least in part on receiving the indication of the change in DMRS configurations, a blind detection technique to detect the first dynamic DMRS configuration.

The detection component 1008 may perform, based at least in part on receiving the indication to operate in the dynamic DMRS mode, a blind detection technique at each symbol and in each slot while operating in the dynamic DMRS mode to detect the dynamic DMRS configurations used by the base station.

The reception component 1002 may receive, from the base station, an indication to no longer operate in the dynamic DMRS mode.

The reception component 1002 may receive, from the base station, an additional DMRS using a second dynamic DMRS configuration, where a resource allocation or a DMRS pattern for the second dynamic DMRS configuration is not indicated to the UE.

The detection component 1008 may perform, based at least in part on receiving the indication to operate in the dynamic DMRS mode, a blind detection technique using a first coherence bandwidth of a signal and a second coherence bandwidth of the signal to detect the first dynamic DMRS configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
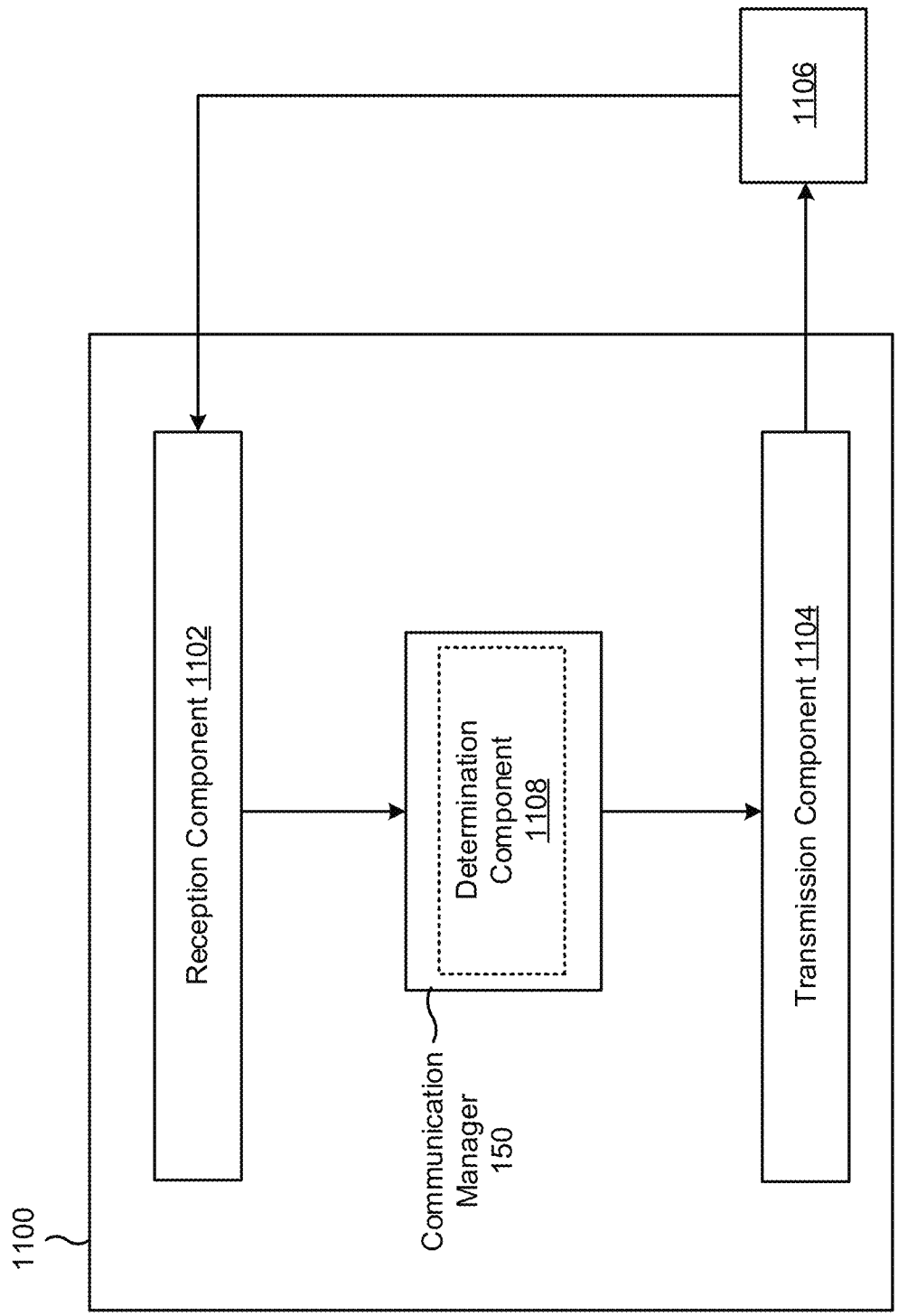

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 6 and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, an indication to operate in a dynamic DMRS mode, where the dynamic DMRS mode includes the base station using dynamic DMRS configurations without an explicit indication of DMRS resource locations for the dynamic DMRS configurations. The transmission component 1104 may transmit, to the UE based at least in part on transmitting the indication to operate in the dynamic DMRS mode, a DMRS using a first dynamic DMRS configuration.

The determination component 1108 may determine the first dynamic DMRS configuration based at least in part on one or more channel conditions experienced by the UE. The determination component 1108 may refrain from transmitting an indication of the first dynamic DMRS configuration based at least in part on transmitting the indication to operate in the dynamic DMRS mode.

The determination component 1108 may determine to change from the first dynamic DMRS configuration to a second dynamic DMRS configuration.

The transmission component 1104 may transmit, to the UE, an indication of a change in DMRS configurations to be used by the base station.

The transmission component 1104 may transmit, to the UE, an indication to no longer operate in the dynamic DMRS mode.

The determination component 1108 may determine to change from the first dynamic DMRS configuration to a second dynamic DMRS configuration. The determination component 1108 may refrain from transmitting an indication of the second dynamic DMRS configuration. The transmission component 1104 may transmit, to the UE, an additional DMRS using the second dynamic DMRS configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, an indication to operate in a dynamic demodulation reference signal (DMRS) mode, wherein the dynamic DMRS mode includes a use of dynamic DMRS configurations without an explicit indication of DMRS resource locations for the dynamic DMRS configurations; and receiving, from the base station based at least in part on receiving the indication to operate in the dynamic DMRS mode, a DMRS using a first dynamic DMRS configuration.

Aspect 2: The method of Aspect 1, further comprising: detecting a presence of the DMRS in one or more time domain resources and one or more frequency domain resources of a signal via a blind detection technique; and detecting the first dynamic DMRS configuration based at least in part on detecting the presence of the DMRS in the one or more time domain resources and the one or more frequency domain resources of the signal.

Aspect 3: The method of any of Aspects 1-2, wherein the dynamic DMRS mode is associated with a set of DMRS configurations, and wherein receiving the DMRS comprises: detecting the first dynamic DMRS configuration, from the set of DMRS configurations, using a blind detection technique; and receiving the DMRS based at least in part on detecting the first dynamic DMRS configuration.

Aspect 4: The method of any of Aspects 1-3, further comprising: receiving, from the base station, an indication of a change in DMRS configurations to be used by the base station; and performing, based at least in part on receiving the indication of the change in DMRS configurations, a blind detection technique to detect the first dynamic DMRS configuration, and wherein receiving the DMRS comprises: receiving, from the base station, the DMRS using the first dynamic DMRS configuration based at least in part on performing the blind detection technique.

Aspect 5: The method of any of Aspects 1-3, further comprising: performing, based at least in part on receiving the indication to operate in the dynamic DMRS mode, a blind detection technique at each symbol and in each slot while operating in the dynamic DMRS mode to detect the dynamic DMRS configurations used by the base station.

Aspect 6: The method of any of Aspects 1-5, wherein the indication to operate in the dynamic DMRS mode is a semi-persistent indication that indicates an amount of time that the UE is to operate in the dynamic DMRS mode.

Aspect 7: The method of any of Aspects 1-6, further comprising: receiving, from the base station, an indication to no longer operate in the dynamic DMRS mode.

Aspect 8: The method of any of Aspects 1-7, further comprising: receiving, from the base station, an additional DMRS using a second dynamic DMRS configuration, wherein a resource allocation or a DMRS pattern for the second dynamic DMRS configuration is not indicated to the UE.

Aspect 9: The method of any of Aspects 1-8, further comprising: performing, based at least in part on receiving the indication to operate in the dynamic DMRS mode, a blind detection technique using a first coherence bandwidth of a signal and a second coherence bandwidth of the signal to detect the first dynamic DMRS configuration.

Aspect 10: The method of any of Aspects 1-9, wherein receiving the indication to operate in the dynamic DMRS mode comprises: receiving the indication to operate in the dynamic DMRS mode via at least one of a radio resource control message, a medium access control (MAC) control element (MAC-CE) message, or a downlink control information message.

Aspect 11: A method of wireless communication performed by a base station, comprising: transmitting, to a user equipment (UE), an indication to operate in a dynamic demodulation reference signal (DMRS) mode, wherein the dynamic DMRS mode includes the base station using dynamic DMRS configurations without an explicit indication of DMRS resource locations for the dynamic DMRS configurations; and transmitting, to the UE based at least in part on transmitting the indication to operate in the dynamic DMRS mode, a DMRS using a first dynamic DMRS configuration.

Aspect 12: The method of Aspect 11, further comprising: determining the first dynamic DMRS configuration based at least in part on one or more channel conditions experienced by the UE; and refraining from transmitting an indication of the first dynamic DMRS configuration based at least in part on transmitting the indication to operate in the dynamic DMRS mode.

Aspect 13: The method of any of Aspects 11-12, wherein the dynamic DMRS mode is associated with a set of DMRS configurations, and wherein transmitting the DMRS comprises: transmitting the DMRS the first dynamic DMRS configuration that is included in the set of DMRS configurations.

Aspect 14: The method of any of Aspects 11-13, further comprising: determining to change from the first dynamic DMRS configuration to a second dynamic DMRS configuration; and transmitting, to the UE, an indication of a change in DMRS configurations to be used by the base station; and wherein transmitting the DMRS comprises: transmitting, to the UE, the DMRS using the second dynamic DMRS configuration.

Aspect 15: The method of any of Aspects 11-14, wherein the indication to operate in the dynamic DMRS mode is a semi-persistent indication that indicates an amount of time that the UE is to operate in the dynamic DMRS mode.

Aspect 16: The method of any of Aspects 11-15, further comprising: transmitting, to the UE, an indication to no longer operate in the dynamic DMRS mode.

Aspect 17: The method of any of Aspects 11-16, further comprising: determining to change from the first dynamic DMRS configuration to a second dynamic DMRS configuration; refraining from transmitting an indication of the second dynamic DMRS configuration; and transmitting, to the UE, an additional DMRS using the second dynamic DMRS configuration.

Aspect 18: The method of any of Aspects 11-17, wherein transmitting the indication to operate in the dynamic DMRS mode comprises: transmitting the indication to operate in the dynamic DMRS mode via at least one of a radio resource control message, a medium access control (MAC) control element (MAC-CE) message, or a downlink control information message.

Aspect 19: An apparatus for wireless communication at a device, comprising a processor; memory coupled with the processor; and instructions stored in the memory and executable by the processor to cause the apparatus to perform the method of one or more of Aspects 1-10.

Aspect 20: A device for wireless communication, comprising a memory and one or more processors coupled to the memory, the one or more processors configured to perform the method of one or more of Aspects 1-10.

Aspect 21: An apparatus for wireless communication, comprising at least one means for performing the method of one or more of Aspects 1-10.

Aspect 22: A non-transitory computer-readable medium storing code for wireless communication, the code comprising instructions executable by a processor to perform the method of one or more of Aspects 1-10.

Aspect 23: A non-transitory computer-readable medium storing a set of instructions for wireless communication, the set of instructions comprising one or more instructions that, when executed by one or more processors of a device, cause the device to perform the method of one or more of Aspects 1-10.

Aspect 24: An apparatus for wireless communication at a device, comprising a processor; memory coupled with the processor; and instructions stored in the memory and executable by the processor to cause the apparatus to perform the method of one or more of Aspects 11-18.

Aspect 25: A device for wireless communication, comprising a memory and one or more processors coupled to the memory, the one or more processors configured to perform the method of one or more of Aspects 11-18.

Aspect 26: An apparatus for wireless communication, comprising at least one means for performing the method of one or more of Aspects 11-18.

Aspect 27: A non-transitory computer-readable medium storing code for wireless communication, the code comprising instructions executable by a processor to perform the method of one or more of Aspects 11-18.

Aspect 28: A non-transitory computer-readable medium storing a set of instructions for wireless communication, the set of instructions comprising one or more instructions that, when executed by one or more processors of a device, cause the device to perform the method of one or more of Aspects 11-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of:

a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from a network entity, an indication to operate in a dynamic demodulation reference signal (DMRS) mode, wherein the dynamic DMRS mode includes a use of dynamic DMRS configurations without an explicit indication of DMRS resource locations for the dynamic DMRS configurations; and
      receive, from the network entity and without receiving the explicit indication of the DMRS resource locations for the dynamic DMRS configurations, a DMRS using a first dynamic DMRS configuration, wherein receiving the DMRS using the first dynamic DMRS configuration is based at least in part on receiving the indication to operate in the dynamic DMRS mode.

2. The UE of claim 1, wherein the one or more processors are further configured to:
   detect a presence of the DMRS in one or more time domain resources and one or more frequency domain resources of a signal via a blind detection technique; and
   detect the first dynamic DMRS configuration based at least in part on detecting the presence of the DMRS in the one or more time domain resources and the one or more frequency domain resources of the signal.

3. The UE of claim 1, wherein the dynamic DMRS mode is associated with a set of DMRS configurations, and wherein the one or more processors, to receive the DMRS, are configured to:
   detect the first dynamic DMRS configuration, from the set of DMRS configurations, using a blind detection technique; and
   receive the DMRS based at least in part on detecting the first dynamic DMRS configuration.

4. The UE of claim 1, wherein the one or more processors are further configured to:
   receive, from the network entity, an indication of a change in DMRS configurations to be used by the network entity; and
   perform, based at least in part on receiving the indication of the change in DMRS configurations, a blind detection technique to detect the first dynamic DMRS configuration, and
   wherein the one or more processors, to receive the DMRS, are configured to:
      receive, from the network entity, the DMRS using the first dynamic DMRS configuration based at least in part on performing the blind detection technique.

5. The UE of claim 1, wherein the one or more processors are further configured to:
   perform, based at least in part on receiving the indication to operate in the dynamic DMRS mode, a blind detection technique at each symbol and in each slot while operating in the dynamic DMRS mode to detect the dynamic DMRS configurations used by the network entity.

6. The UE of claim 1, wherein the indication to operate in the dynamic DMRS mode is a semi-persistent indication that indicates an amount of time that the UE is to operate in the dynamic DMRS mode.

7. The UE of claim 1, wherein the one or more processors are further configured to:
   receive, from the network entity, an indication to no longer operate in the dynamic DMRS mode.

8. The UE of claim 1, wherein the one or more processors are further configured to:
   perform, based at least in part on receiving the indication to operate in the dynamic DMRS mode, a blind detection technique using a first coherence bandwidth of a signal and a second coherence bandwidth of the signal to detect the first dynamic DMRS configuration.

9. A network entity for wireless communication, comprising:
   a memory; and
   one or more processors, coupled to the memory, configured to:
      transmit, to a user equipment (UE), an indication to operate in a dynamic demodulation reference signal (DMRS) mode, wherein the dynamic DMRS mode includes the network entity using dynamic DMRS configurations without an explicit indication of DMRS resource locations for the dynamic DMRS configurations; and
      transmit, to the UE and without the explicit indication of DMRS locations for the dynamic DMRS configurations, a DMRS using a first dynamic DMRS configuration, wherein transmitting the DMRS using the first dynamic DMRS configuration is based at least in part on transmitting the indication to operate in the dynamic DMRS mode.

10. The network entity of claim 9, wherein the one or more processors are further configured to:
    determine the first dynamic DMRS configuration based at least in part on one or more channel conditions experienced by the UE; and
    refrain from transmitting an indication of the first dynamic DMRS configuration based at least in part on transmitting the indication to operate in the dynamic DMRS mode.

11. The network entity of claim 9, wherein the dynamic DMRS mode is associated with a set of DMRS configurations, and wherein the one or more processors, to transmit the DMRS, are configured to:

transmit the DMRS the first dynamic DMRS configuration that is included in the set of DMRS configurations.

12. The network entity of claim 9, wherein the one or more processors are further configured to:
   determine to change from the first dynamic DMRS configuration to a second dynamic DMRS configuration; and
   transmit, to the UE, an indication of a change in DMRS configurations to be used by the network entity; and
   wherein the one or more processors, to transmit the DMRS, are configured to:
      transmit, to the UE, the DMRS using the second dynamic DMRS configuration.

13. The network entity of claim 9, wherein the indication to operate in the dynamic DMRS mode is a semi-persistent indication that indicates an amount of time that the UE is to operate in the dynamic DMRS mode.

14. The network entity of claim 9, wherein the one or more processors are further configured to:
   transmit, to the UE, an indication to no longer operate in the dynamic DMRS mode.

15. The network entity of claim 9, wherein the one or more processors are further configured to:
   determine to change from the first dynamic DMRS configuration to a second dynamic DMRS configuration;
   refrain from transmitting an indication of the second dynamic DMRS configuration; and
   transmit, to the UE, an additional DMRS using the second dynamic DMRS configuration.

16. A method of wireless communication performed by a user equipment (UE), comprising:
   receiving, from a network entity, an indication to operate in a dynamic demodulation reference signal (DMRS) mode, wherein the dynamic DMRS mode includes a use of dynamic DMRS configurations without an explicit indication of DMRS resource locations for the dynamic DMRS configurations; and
   receiving, from the network entity and without receiving the explicit indication of the DMRS resource locations for the dynamic DMRS configurations, a DMRS using a first dynamic DMRS configuration, wherein receiving the DMRS using the first dynamic DMRS configuration is based at least in part on receiving the indication to operate in the dynamic DMRS mode.

17. The method of claim 16, further comprising:
   detecting a presence of the DMRS in one or more time domain resources and one or more frequency domain resources of a signal via a blind detection technique; and
   detecting the first dynamic DMRS configuration based at least in part on detecting the presence of the DMRS in the one or more time domain resources and the one or more frequency domain resources of the signal.

18. The method of claim 16, wherein the dynamic DMRS mode is associated with a set of DMRS configurations, and wherein receiving the DMRS comprises:
   detecting the first dynamic DMRS configuration, from the set of DMRS configurations, using a blind detection technique; and
   receiving the DMRS based at least in part on detecting the first dynamic DMRS configuration.

19. The method of claim 16, further comprising:
   receiving, from the network entity, an indication of a change in DMRS configurations to be used by the network entity; and performing, based at least in part on receiving the indication of the change in DMRS configurations, a blind detection technique to detect the first dynamic DMRS configuration, and
wherein receiving the DMRS comprises:
   receiving, from the network entity, the DMRS using the first dynamic DMRS configuration based at least in part on performing the blind detection technique.

20. The method of claim 16, further comprising:
   performing, based at least in part on receiving the indication to operate in the dynamic DMRS mode, a blind detection technique at each symbol and in each slot while operating in the dynamic DMRS mode to detect the dynamic DMRS configurations used by the network entity.

21. The method of claim 16, wherein the indication to operate in the dynamic DMRS mode is a semi-persistent indication that indicates an amount of time that the UE is to operate in the dynamic DMRS mode.

22. The method of claim 16, further comprising:
   receiving, from the network entity, an indication to no longer operate in the dynamic DMRS mode.

23. The method of claim 16, further comprising:
   performing, based at least in part on receiving the indication to operate in the dynamic DMRS mode, a blind detection technique using a first coherence bandwidth of a signal and a second coherence bandwidth of the signal to detect the first dynamic DMRS configuration.

24. A method of wireless communication performed by a network entity, comprising:
   transmitting, to a user equipment (UE), an indication to operate in a dynamic demodulation reference signal (DMRS) mode, wherein the dynamic DMRS mode includes the network entity using dynamic DMRS configurations without an explicit indication of DMRS resource locations for the dynamic DMRS configurations; and
   transmitting, to the UE and without the explicit indication of DMRS locations for the dynamic DMRS configurations, a DMRS using a first dynamic DMRS configuration, wherein transmitting the DMRS using the first dynamic DMRS configuration is based at least in part on transmitting the indication to operate in the dynamic DMRS mode.

25. The method of claim 24, further comprising:
   determining the first dynamic DMRS configuration based at least in part on one or more channel conditions experienced by the UE; and
   refraining from transmitting an indication of the first dynamic DMRS configuration based at least in part on transmitting the indication to operate in the dynamic DMRS mode.

26. The method of claim 24, wherein the dynamic DMRS mode is associated with a set of DMRS configurations, and wherein transmitting the DMRS comprises:
   transmitting the DMRS the first dynamic DMRS configuration that is included in the set of DMRS configurations.

27. The method of claim 24, further comprising:
   determining to change from the first dynamic DMRS configuration to a second dynamic DMRS configuration; and
   transmitting, to the UE, an indication of a change in DMRS configurations to be used by the network entity; and wherein transmitting the DMRS comprises:
  transmitting, to the UE, the DMRS using the second dynamic DMRS configuration.

28. The method of claim 24, wherein the indication to operate in the dynamic DMRS mode is a semi-persistent indication that indicates an amount of time that the UE is to operate in the dynamic DMRS mode.

29. The method of claim 24, further comprising:
  transmitting, to the UE, an indication to no longer operate in the dynamic DMRS mode.

30. The method of claim 24, further comprising:
  determining to change from the first dynamic DMRS configuration to a second dynamic DMRS configuration;
  refraining from transmitting an indication of the second dynamic DMRS configuration; and
  transmitting, to the UE, an additional DMRS using the second dynamic DMRS configuration.

* * * * *